United States Patent
Xie et al.

(10) Patent No.: US 12,479,911 B2
(45) Date of Patent: *Nov. 25, 2025

(54) HUMANIZED ANTI-VEGF ANTIBODY FAB FRAGMENT

(71) Applicant: SinoCellTech Ltd., Beijing (CN)

(72) Inventors: Liangzhi Xie, Beijing (CN); Chunyun Sun, Beijing (CN); Jun Zhao, Beijing (CN); Desheng Kong, Beijing (CN)

(73) Assignee: SinoCellTech Ltd., Beijing (CN)

( * ) Notice: Subject to any disclaimer, the term of this patent is extended or adjusted under 35 U.S.C. 154(b) by 952 days.

This patent is subject to a terminal disclaimer.

(21) Appl. No.: 17/578,424

(22) Filed: Jan. 18, 2022

(65) Prior Publication Data

US 2022/0135665 A1     May 5, 2022

Related U.S. Application Data

(63) Continuation of application No. PCT/CN2020/102560, filed on Jul. 17, 2020.

(30) Foreign Application Priority Data

Jul. 19, 2019 (CN) .......................... 201910657311.8

(51) Int. Cl.
*C07K 16/22* (2006.01)

(52) U.S. Cl.
CPC .......... *C07K 16/22* (2013.01); *C07K 2317/24* (2013.01); *C07K 2317/522* (2013.01); *C07K 2317/55* (2013.01); *C07K 2317/565* (2013.01); *C07K 2317/567* (2013.01); *C07K 2317/76* (2013.01); *C07K 2317/92* (2013.01)

(58) Field of Classification Search
None
See application file for complete search history.

(56) References Cited

U.S. PATENT DOCUMENTS 10,221,234 B2 *  3/2019  Bhinder ................. C07K 16/18
12,060,416 B2 *  8/2024  Xie ........................ A61P 35/00

FOREIGN PATENT DOCUMENTS

| CN | 1946422 A | 4/2007 |
| CN | 102286101 A | 5/2013 |
| CN | 104761643 A | 7/2015 |
| WO | 2017/119435 A1 | 7/2017 |

OTHER PUBLICATIONS

Brekke et al. (Cur. Opin. Pharmacol. 3: 544-550, 2003).*
Haryadi et al. (2015)(PLoS One 10(2): e0116878. Doi:10.137/journal.pone.0116878).*
Kong Deok-Hoon et al. "A review of Anti-Angiogenic Targets for Monoclonal Antibody Cancer Therapy", International Journal of Molecular Sciences, Aug. 17, 2017, 25 pages, Korea.

* cited by examiner

*Primary Examiner* — Christine J Saoud
(74) *Attorney, Agent, or Firm* — Smart & Biggar LP

(57) ABSTRACT

The present invention belongs to the field of tumor immunotherapy, and relates to a humanized anti-VEGF antibody Fab fragment. The present invention discloses nucleic acid sequences (including heavy/light chain variable regions) encoding said antibody fragment, and vectors, pharmaceutical compositions and kits containing said nucleic acid sequences. The anti-VEGF antibody Fab fragments disclosed in the present invention can specifically bind to VEGF with high affinity and block the binding of VEGF to the receptor VEGFR2, and also neutralize the proliferative effect of VEGF on HUVEC cells. Compared to the full-length antibody, antibodies in the form of Fab fragments have stronger penetrability and less toxic in terms of gastrointestinal perforation, hypertension and hemorrhage and do not stimulate the complement cascade reaction, thus reducing the risk of endophthalmitis and autoimmune inflammatory reactions. Thus it could be used in clinical treatment of ocular diseases characterized by choroidal neovascularization, including but not limited to age-related macular degeneration (AMD), diabetic macular edema (DME), retinal edema, degenerative myopia, choroidal neovascularization (CNV).

5 Claims, 8 Drawing Sheets

Specification includes a Sequence Listing.

HUMANIZED ANTI-VEGF ANTIBODY FAB FRAGMENT

CROSS-REFERENCE SECTION

This application is a continuation of and claims priority to PCT Application No. PCT/CN2020/102560 filed Jul. 17, 2020, which itself claims priority to Chinese Patent Application No. 201910657311.8 filed Jul. 19, 2019. The contents from all of the above are hereby incorporated in their entirety by reference.

SEQUENCE LISTING IN ELECTRONIC FORM

An ASCII text file containing the sequence listing in electronic form is submitted herewith. The ASCII text file was created on Sep. 12, 2025, and has the filename "92435899SL20250912.txt" and a file size of 68,985 bytes, the contents of which are incorporated herein by reference in their entirety.

TECHNICAL FIELD

The present invention relates to the field of tumor immunotherapy, specifically relates to humanized anti-VEGF antibody Fab fragments.

BACKGROUND

The development of the vascular system is the foundation of many physiological and pathological processes. Vascular endothelial growth factor (VEGF) is a group of growth factors possessing important pro-angiogenic activities that promote endothelial cell mitosis and anti-apoptosis, increase vascular permeability, and promote cell migration. The human VEGF gene is localized on chromosome 6p21.3 and belongs to the VEGF/PDGF supergene family, which encodes VEGF linked by disulfide bonds to form a dimer. In humans, the VEGF family includes multiple members with different functions: VEGFA (VEGF, with various different splicing variants), VEGFB, VEGFC, VEGFD, VEGFE, VEGFF, and placenta growth factor (PlGF). Recently, endocrine gland-derived vascular endothelial growth factor (EG-VEGF) has been also included in this family (Samson M et al., J Clin Endocrinal Metab. 2004; 89(8):4078-4088). VEGF is widely distributed in human tissues and organs, among which the eye retinal pigment epithelial cells, vascular endothelial cells, nerve cells, etc. are expressed (Goel H L et al., Nat Rev Cancer. 2013; 13(12): 871). There are three types of VEGF receptors: VEGFR1, VEGFR2 and VEGFR3. The binding of VEGF to the receptor extracellular domain triggers receptor dimerization and promote autophosphorylation of tyrosine residues in the intracellular domain, thereby activating downstream signals that promote cell proliferation, migration, anti-apoptosis and increased vascular permeability. VEGFR1 and VEGFR2 are mainly expressed in vascular endothelial cells, while VEGFR3 is mainly expressed in lymphatic endothelial cells.

VEGF has been confirmed to play an important role in the regulation of normal and pathological angiogenesis (Melincovici C S et al., Rom J Morphol Embryol. 2018; 59(2): 455-467). VEGF is overexpressed in a variety of tumors that can cause malignant ascites, and the expression of VEGF in tumors is correlated with the migration ability of tumor cells. The concentration of VEGF in patients with solid tumors of poorer survival rate such as gastrointestinal, ovarian, breast and lung cancers is positively correlated with disease stage (Sebastian, K et al., Oncologist. 2009; 14(12): 1242-1251). The development of several lesions in posterior segment diseases such as age-related macular degeneration (AMD), diabetic macular edema (DME), retinal edema, degenerative myopia, and choroidal neovascularization (CNV) are also closely associated with VEGF expression levels (Patel J R et al., Curr opin ophthalmol. 2016; 27(5): 387-392; Tan G S et al., Lancet Diabetes Endo. 2017; 5(2): 143-155; Mitchell P et al., Lancet. 2018; 392(10153): 1147-1159).

VEGF monoclonal antibody drugs inhibit endothelial cell expansion and neovascularization by inhibiting the interaction of VEGF with the endothelial cell surface receptors VEGFR2 and VEGFR1, and subsequent blocking downstream signaling pathway. The FDA approved VEGF-targeted antibody drugs for the treatment of ophthalmic diseases include Lucentis® (Ranibizumab, approved in 2006), EYLEA® (Aflibercept, approved in 2004), and Conbercept which was also marketed in China. Lucentis® (Ranibizumab) is a human-derived VEGFA antibody Fab fragment that binds all active forms of VEGFA and inhibits its binding to VEGFR1 and VEGFR2, thereby inhibiting the proliferation and migration of vascular endothelial cells and reducing vascular permeability, thus inhibiting formation of choroidal neovascularization. Compared to the full-length antibody, antibodies in the form of Fab fragments can easily cross the retina to the subretinal space and reach the target tissue to bind to VEGF, thus inhibiting the formation of choroidal neovascularization. Fab fragment antibodies that enter the general system through the blood circulation are eliminated in only 0.09 days or about 2 hours, minimizing the impact on the physiological functions of normal VEGF and reducing toxic effects such as gastrointestinal perforation, hypertension and hemorrhage (Ferrara, N et al., Retina. 2006; 26(8): 859-870; Van Wijngaarden et al., Clin Exp Optom. 2008; 91(5): 427-437). Studies have shown a relationship between AMD and the inflammatory response caused by complement effects, and the Fab antibody fragment, which does not contain an Fc portion, does not stimulate the complement cascade, thus reducing the risk of endophthalmitis and autoimmune inflammatory responses (Ferrara, N et al., Retina. 2006; 26(8): 859-870). Lucentis® (Ranibizumab) has been approved for treatment of wet AMD, CNV, DME, and retinal edema. Bevacizumab is a recombinant human monoclonal antibody approved by the FDA for the treatment of solid tumors such as metastatic colon cancer and non-small cell lung cancer, and is currently used as an off-label drug for the treatment of AMD. Aflibercept and Conbercept are humanized recombinant fusion proteins that contain a specific domain of VEGFR that binds to the ligands, and can bind to VEGF with specific high affinity and block the binding of VEGF to receptors. Aflibercept has a higher affinity for VEGF165 than Bevacizumab and Lucentis® (Ranibizumab) and has shown superior efficacy in the treatment of DME. Aflibercept has been approved for the treatment of wet AMD, branch retinal vein occlusion, central retinal vein occlusion, CNV, DME, and diabetic retinopathy. Conbercept has been approved in China for the treatment of wet AMD.

As these drugs are administered intravitreally topically, frequent administration is highly likely to cause damages from ocular and periocular infections. Therefore, optimization of the drug is needed to improve its efficacy and reduce the frequency of administration to bring greater therapeutic benefit to patients.

SUMMARY

The present invention provides novel humanized anti-VEGF antibody Fab fragments that can be used to treat ocular diseases characterized by choroidal neovascularization, including but not limited to the occurrence of age-related macular degeneration (AMD), diabetic macular edema (DME), retinal edema, degenerative myopia, and choroidal neovascularization (CNV).

In one aspect, the present invention provides an isolated anti-VEGF antibody or antigen-binding fragment thereof, comprising a heavy chain variable region having a heavy chain CDR1 region having the amino acid sequence as set forth in SEQ ID NO: 13 and a heavy chain CDR2 region having the amino acid sequence as set forth in SEQ ID NO: 14 and a heavy chain CDR3 region having the amino acid sequence as set forth in SEQ ID NO: 15; and a light chain variable region having a light chain CDR1 region having the amino acid sequence as set forth in SEQ ID NO: 10, a light chain CDR2 region having the amino acid sequence as set forth in SEQ ID NO: 11, and a light chain CDR3 region having the amino acid sequence as set forth in SEQ ID NO: 12.

In some embodiments, said anti-VEGF antibody or antigen-binding fragment thereof has a heavy chain variable region having the amino acid sequence as set forth in SEQ ID NO: 22, or the amino acid sequences having at least 90%, 92%, 95%, 98% or 99% sequence identity to SEQ ID NO: 22; and a light chain variable region having the amino acid sequence as set forth in SEQ ID NO: 23, or the amino acid sequences having at least 90%, 92%, 95%, 98% or 99% sequence identity to SEQ ID NO: 23.

In some embodiments, said anti-VEGF antibody or antigen-binding fragment thereof further comprises a heavy chain constant region and a light chain constant region, preferably the heavy chain constant region is the IgG1 heavy chain constant region having the amino acid sequence as set forth in SEQ ID NO: 38, or the amino acid sequences having at least 90%, 92%, 95%, 98%, or 99% sequence identity to SEQ ID NO: 38; and/or the light chain constant region is the light chain constant region having the amino acid sequence as set forth in SEQ ID NO: 39, or the amino acid sequences having at least 90%, 92%, 95%, 98%, or 99% sequence identity to SEQ ID NO: 39.

In some embodiments, said anti-VEGF antibody or antigen-binding fragment thereof is a humanized antibody or a chimeric antibody.

In another aspect, the present invention provides an isolated anti-VEGF antibody or antigen-binding fragment thereof, comprising a heavy chain variable region having a heavy chain CDR1 region having the amino acid sequence as set forth in SEQ ID NO: 27 and a heavy chain CDR2 region having the amino acid sequence as set forth in SEQ ID NO: 28 and a heavy chain CDR3 region having the amino acid sequence as set forth in SEQ ID NO: 29; and a light chain variable region having a light chain CDR1 region having the amino acid sequence as set forth in SEQ ID NO: 24, a light chain CDR2 region having the amino acid sequence as set forth in SEQ ID NO: 25, and a light chain CDR3 region having the amino acid sequence as set forth in SEQ ID NO: 26.

In some embodiments, said anti-VEGF antibody or antigen-binding fragment thereof comprises a heavy chain constant region having the amino acid sequence as set forth in SEQ ID NO: 36, or the amino acid sequences having at least 90%, 92%, 95%, 98%, or 99% sequence identity to SEQ ID NO: 36; and a light chain variable region having the amino acid sequence as set forth in SEQ ID NO: 37, or the amino acid sequences having at least 90%, 92%, 95%, 98% or 99% sequence identity to SEQ ID NO: 37.

In some embodiments, said anti-VEGF antibody or antigen-binding fragment thereof is a Fab fragment, said Fab fragment further comprises a heavy chain constant region CH1 and a light chain constant region, preferably the heavy chain constant region CH1 is the IgG1 heavy chain constant region having the amino acid sequence as set forth in SEQ ID NO: 40, or the amino acid sequences having at least 90%, 92%, 95%, 98%, or 99% sequence identity to SEQ ID NO: 40; and/or the light chain constant region is the light chain constant region having the amino acid sequence as set forth in SEQ ID NO: 39, or the amino acid sequences having at least 90%, 92%, 95%, 98%, or 99% sequence identity to SEQ ID NO: 39.

In some embodiments, said anti-VEGF antibody or antigen-binding fragment thereof further comprises a heavy chain signal peptide and a light chain signal peptide, preferably said heavy chain signal peptide is an amino acid sequence as set forth in SEQ ID NO: 34, or the amino acid sequences having at least 90%, 92%, 95%, 98% or 99% sequence identity to SEQ ID NO: 34, and/or said light chain signal peptide is an amino acid sequence as set forth in SEQ ID NO: 35 or the amino acid sequences having at least 90%, 92%, 95%, 98% or 99% sequence identity to SEQ ID NO: 35.

In some embodiments, said anti-VEGF antibody or antigen-binding fragment thereof is a Fab antibody fragment.

In some embodiments, said anti-VEGF antibody or antigen-binding fragment thereof is an IgG antibody, preferably an IgG1 antibody.

In some embodiments, said anti-VEGF antibody Fab fragment is an IgG antibody-related Fab antibody fragment, preferably an IgG1 antibody-related Fab antibody fragment In some embodiments, said anti-VEGF antibody or antigen-binding fragment thereof is a monoclonal antibody.

In some embodiments, said anti-VEGF antibody Fab fragment is monoclonal.

In some embodiments, the binding affinity $K_D$ of said anti-VEGF antibody or antigen-binding fragment thereof to the recombinant human VEG165 protein is 0.01-8E-10M, preferably 0.1-5E-10M, and more preferably 0.5-3E-10M, most preferably 1.54E-10M.

In some embodiments, said antigen-binding fragment is Fv, Fab, Fab', Fab'-SH, F(ab')2, Fd fragment, Fd' fragment, single chain antibody molecule or single domain antibody; wherein the single chain antibody molecule is preferably scFv, di-scFv, tri-scFv, diabody or scFab.

In yet another aspect, the present invention provides an antibody-drug conjugate, comprising the anti-VEGF antibody or antigen-binding fragment thereof of the present invention and an additional therapeutic agent, preferably said anti-VEGF antibody or antigen-binding fragment thereof is connected with said additional therapeutic agent via a linker.

In yet another aspect, the present invention provides a nucleic acid encoding the anti-VEGF antibody or antigen-binding fragment thereof of the present invention.

In some embodiments, said nucleic acid comprises the nucleotide sequence as set forth in SEQ ID NO: 4 and/or the nucleotide sequence as set forth in SEQ ID NO: 5; or comprises the nucleotide sequence as set forth in SEQ ID NO: 20 and/or the nucleotide sequence as set forth in SEQ ID NO: 21; or comprises the nucleotide sequence as set forth in SEQ ID NO: 45 and/or the nucleotide sequence as set forth in SEQ ID NO: 46. Preferably, said nucleic acid further comprises the nucleotide sequence as set forth in SEQ ID NO: 49 and/or the nucleotide sequence as set forth in SEQ ID NO: 48. More preferably, said nucleic acid comprises the nucleotide sequence as set forth in SEQ ID NO: 41 and/or the nucleotide sequence as set forth in SEQ ID NO: 42.

In yet another aspect, the present invention provides an expression vector, comprising the nucleic acid of the present invention.

In yet another aspect, the present invention provides a host cell, comprising the nucleic acid of the present invention or the expression vector of the present invention.

In yet another aspect, the present invention provides a method for producing the anti-VEGF antibody or antigen-binding fragment thereof of the present invention, comprising culturing the host cell of the present invention under conditions suitable for antibody expression, and harvesting the expressed antibody from the culture medium.

In yet another aspect, the present invention provides a method for producing the anti-VEGF antibody or antigen-binding fragment thereof of the present invention, comprising culturing the host cell of the present invention under conditions suitable for Fab antibody fragment expression, and harvesting the expressed Fab antibody fragment from the culture medium.

In yet another aspect, the present invention provides a pharmaceutical composition, comprising the anti-VEGF antibody or antigen-binding fragment thereof of the present invention, or the antibody-drug conjugate of the present invention, or the nucleic acid of the present invention, or the expression vector of the present invention, and a pharmaceutically acceptable carrier.

In yet another aspect, the present invention provides the anti-VEGF antibody or antigen-binding fragment thereof of the present invention or the antibody-drug conjugate of the present invention or the pharmaceutical composition of the present invention, for use in the treatment of diseases related to angiogenesis.

In some embodiments, said disease associated with angiogenesis is an ocular disease.

In some embodiments, said ocular disease is an ocular disease characterized by choroidal neovascularization, including age-related macular degeneration (AMD), diabetic macular edema (DME), retinal edema, degenerative myopia, choroidal neovascularization (CNV).

In yet another aspect, the present invention provides a method for treating angiogenesis-related diseases, comprising administering to a subject in need a therapeutically effective amount of the anti-VEGF antibody or antigen-binding fragment of the present invention or the antibody-drug conjugate of the present invention or the pharmaceutical composition of the present invention, thereby treating the disease associated with angiogenesis.

In some embodiments, said disease associated with angiogenesis is an ocular disease.

In some embodiments, said ocular disease is an ocular disease characterized by choroidal neovascularization, including age-related macular degeneration (AMD), diabetic macular edema (DME), retinal edema, degenerative myopia, choroidal neovascularization (CNV).

In yet another aspect, the present invention provides the anti-VEGF antibody or antigen-binding fragment thereof of the present invention, or the antibody-drug conjugate of the present invention, or the pharmaceutical composition of the present invention, for use in the preparation of a medicament for the treatment of diseases associated with angiogenesis.

In some embodiments, said disease associated with angiogenesis is an ocular disease.

In some embodiments, said ocular disease is an ocular disease characterized by choroidal neovascularization, including age-related macular degeneration (AMD), diabetic macular edema (DME), retinal edema, degenerative myopia, choroidal neovascularization (CNV).

In yet another aspect, the present invention provides a pharmaceutical combination, comprising the anti-VEGF antibody or antigen-binding fragment thereof of the present invention, or the antibody-drug conjugate of the present invention, or the pharmaceutical composition of the present invention, and one or more additional therapeutic agents.

In yet another aspect, the present invention provides a kit, comprising the anti-VEGF antibody or antigen-binding fragment thereof of the present invention, or the antibody-drug conjugate of the present invention, or the pharmaceutical composition of the present invention, preferably, further comprising a device for administration.

BRIEF DESCRIPTION OF THE DRAWINGS

The present invention is illustrated in combination with the attached drawings, in which.

DETAILED DESCRIPTION

Figure 1:
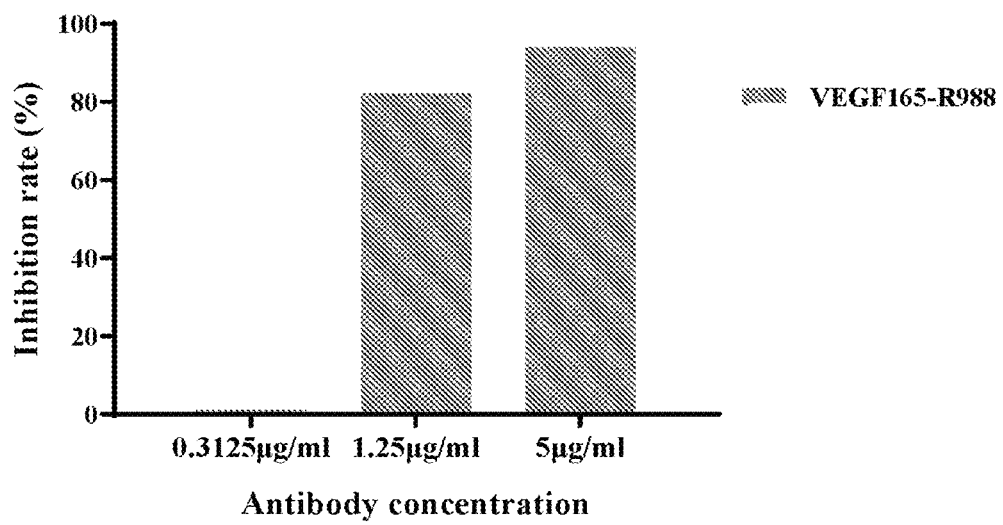
FIG. 1 shows that VEGF165 rabbit antibody VEGF-R988 blocks the binding of VEGF165 to VEGFR2 protein.

Various aspects of the present invention relate to an isolated anti-VEGF antibody Fab fragment, an antibody-drug conjugate comprising said antibody fragment or antigen-binding fragment thereof, a nucleic acid and an expression vector encoding said Fab antibody, and a host cell containing said nucleic acid or expression vector, a method for producing said anti-VEGF Fab antibody, a pharmaceutical composition comprising said anti-VEGF Fab antibody, and a method of using said anti-VEGF Fab antibody for treating diseases associated with angiogenesis.

Definition

Unless otherwise stated, all technical and scientific terms used herein have the meaning normally understood by a person skilled in the art to which the present invention belongs. For the purposes of the present invention, the following terms are defined to be consistent with the meanings commonly understood in the art.

When used herein and in the appended claims, the singular forms "one", "a/an", "another" and "said" include the plural designation of the object unless the context clearly indicates otherwise.

The term "antibody" refers to an immunoglobulin molecule and refers to any form of antibody that exhibits the desired biological activity. These include, but are not limited to, monoclonal antibodies (including full-length monoclonal antibodies), polyclonal antibodies and multispecific antibodies (e.g. bispecific antibodies), and even antibody fragments. Typically, full-length antibody structures preferably comprise four polypeptide chains, two heavy (H) chains and two light (L) chains, typically interconnected by disulfide bonds. Each heavy chain contains a heavy chain variable region and a heavy chain constant region. Each light chain contains a light chain variable region and a light chain constant region. In addition to this typical full-length antibody structure, the structure also includes other derivative forms.

Said heavy chain variable region and light chain variable region can be further subdivided into more conservative regions (called framework regions (FR)) and hypervariable regions (called complementarity determining regions (CDR)) interspersed therewith.

The term "complementary determining region" (CDR, e.g. CDR1, CDR2 and CDR3) refers to such amino acid residues in the variable region of an antibody whose presence is necessary for antigen binding. Each variable region typically has three CDR regions identified as CDR1, CDR2 and CDR3. Each complementary determining region may contain amino acid residues from a "complementary determining region" as defined by Kabat (Kabat et al., Sequences of Proteins of Immunological Interest, 5th Ed. Public Health Service, National Institutes of Health, Bethesda, MD. 1991) and/or those residues from the "high-variable loop" (Chothia and Lesk; J Mol Biol 196:901-917 (1987)).

The term "framework" or "FR" residues are those residues within the variable region other than CDR residues as defined herein.

Each heavy chain variable region and light chain variable region typically contains 3 CDRs and up to 4 FRs, said CDRs and FRs being arranged from the amino terminus to the carboxyl terminus in the following order, for example: FR1, CDR1, FR2, CDR2, FR3, CDR3, and FR4.

The complementary determining region (CDR) and the framework region (FR) of a given antibody can be identified using the Kabat system (Kabat et al: Sequences of Proteins of Immunological Interest, 5th edition, US Department of Health and Human Services, PHS, NIH, NIH Publication No. 91-3242, 1991).

The term "constant region" refers to such amino acid sequences in the light and heavy chains of an antibody that are not directly involved in the binding of the antibody to the antigen but exhibit a variety of effector functions such as antibody-dependent cytotoxicity.

According to the antigenic differences of the amino acid sequence of its constant region, the heavy chain of an antibody can be classified into five classes: $\alpha$, $\delta$, $\varepsilon$, $\gamma$, and $\mu$. When it forms a complete antibody with the light chain, it can be classified into five classes: IgA, IgD, IgE, IgG and IgM, of which can be further classified into subclasses (isotypes), such as IgG1, IgG2, IgG3, IgG4, IgA and IgA2. Based on the amino acid sequence of its constant domain, the light chain of an antibody can be classified into k and λ.

An "antigen-binding fragment of an antibody" comprises a portion of an intact antibody molecule that retains at least some of the binding specificity of the parent antibody and typically includes at least a portion of the antigen-binding region or variable region (e.g. one or more CDRs) of the parent antibody. Examples of antigen-binding fragments include, but are not limited to, Fv, Fab, Fab', Fab'-SH, F(ab')$_2$, Fd fragment, Fd' fragment, single chain antibody molecules (e.g. scFv, di-scFv or tri-scFv, diabody or scFab), single domain antibodies. A Fab fragment usually contains a heavy chain variable region (VH) and a heavy chain constant region 1 (CH1), and a light chain variable region (VL) and a light chain constant region (CL).

The term "antibody fragment" refers to a non-intact antibody molecule that retains at least some of the biological properties of the parent antibody, including, but not limited to, an Fc fragment, in addition to those described above as "antigen-binding fragments".

The term "antibody-drug conjugate" or "ADC" refers to a binding protein, such as an antibody or antigen-binding fragment thereof, that chemically linked to one or more of chemical drugs (also referred to as agents herein), which may optionally be a therapeutic agent or a cytotoxic agent. In a preferred embodiment, an ADC includes an antibody, a cytotoxic or therapeutic drug, and a linker that enables the drug to be linked or conjugated to the antibody. ADCs usually have any value of 1 to 8 drugs conjugated to the antibody, including 2, 4, 6, or 8 drug-loading substances. Non-limiting examples of drugs that can be included in the ADCs are mitotic inhibitors, anti-tumor antibiotics, immunomodulators, vectors for gene therapy, alkylating agents, anti-angiogenic agents, antimetabolites, boron-containing agents, chemotherapeutic protective agents, hormones, anti-hormonal agents, corticosteroids, photoactive therapeutic agents, oligonucleotides, radionuclide agents, topoisomerase inhibitors, tyrosine kinase inhibitors and radiosensitizers.

The term "chimeric antibody" refers to an antibody in which a part of the heavy chain and/or light chain is derived from a specific source or species, and the remaining part is derived from a different source or species. The "chimeric antibody" may also be a functional fragment as defined above. "Humanized antibodies" are a subset of "chimeric antibodies."

The term "humanized antibody" or "humanized antigen-binding fragment" is defined herein as an antibody or antibody fragment that is: (i) derived from a non-human source (e.g., a transgenic mouse carrying a heterologous immune system) and based on a human germline sequence; or (ii) a chimeric antibody where the variable region is of non-human origin and the constant region is of human origin; or (iii) a CDR transplant where the CDR of the variable region is of non-human origin and one or more frame work regions of the variable region are of human origin and the constant region, if any, is of human origin. The aim of "humanization" is to eliminate the immunogenicity of antibodies of non-human origin in the human body, while retaining the greatest possible affinity. It is advantageous to select the human framework sequence that is most similar to the framework sequence of the non-human source antibody as the template for humanization. In some cases, it may be necessary to replace one or more amino acids in the human framework sequence with corresponding residues in the non-human construct to avoid loss of affinity.

The term "monoclonal antibody" refers to an antibody derived from a substantially homogeneous population of antibodies, i.e. every single antibody comprised in the population is identical except for possible mutations (e.g. natural mutations) which may be present in very small quantities. The term "monoclonal" therefore indicates the nature of the antibody in question, i.e. not a mixture of unrelated antibodies. In contrast to polyclonal antibody preparations, which usually comprise different antibodies against different epitopes, each monoclonal antibody in a monoclonal antibody preparation is directed against a single epitope on the antigen. In addition to their specificity, monoclonal antibody preparations have the advantage that they are usually not contaminated by other antibodies. The term "monoclonal" should not be understood as requiring the production of said antibodies by any particular method.

The antibody "specifically binds" to a target antigen such as a tumor-associated peptide antigen target (in this case, VEGF), i.e. binds said antigen with sufficient affinity to enable said antibody to be used as a therapeutic agent, targeting a cell or tissue expressing said antigen, and does not significantly cross-react with other proteins, or does not significantly cross-react with proteins other than the homologues and variants of the target proteins mentioned above (e.g. mutant forms, splice variants, or protein hydrolysis truncated forms).

The term "binding affinity" refers to the strength of the sum of the non-covalent interactions between a molecule's individual binding sites and its binding partners. Unless otherwise stated, "binding affinity", when used herein, refers to the intrinsic binding affinity, which reflects a 1:1 interaction between members of a binding pair (e.g. antibody and antigen). As used herein, the term "KD" refers to the equilibrium dissociation constant of the antibody-antigen interaction. As used herein, the term "$k_{on}$" refers to the rate constant at which an antibody binds to an antigen. As used herein, the term "$k_{off}$" refers to the rate constant at which an antibody dissociates from an antibody/antigen complex. "KD", "binding rate constant $k_{on}$," and "dissociation rate constant $k_{off}$" are commonly used to describe the affinity between a molecule (e.g. an antibody) and its binding partner (e.g. an antigen). Affinity, i.e. the tight degree at which a ligand binds a particular protein. Binding affinity is influenced by non-covalent intermolecular interactions such as hydrogen bonding, electrostatic interactions, hydrophobic and van der Waals forces between two molecules. In addition, the binding affinity between a ligand and its target molecule may be influenced by the presence of other molecules. Affinity can be analyzed by conventional methods known in the art, including the ELISA described herein.

The term "epitope" includes any protein determinant cluster that specifically binds to an antibody or T-cell receptor. Epitope determinant clusters typically consist of a molecule's chemically active surface groups (e.g. amino acid or sugar side chains, or a combination thereof) and often have specific three-dimensional structural features as well as specific charge characteristics.

The term "isolated" antibody is an antibody that has been identified and isolated from the components of the cell where the antibody expressed. Isolated antibodies include in situ antibodies inside of recombinant cells, where at least one component in natural environment of said antibody is absent. However, usually, the isolated antibody is prepared through at least one purification step.

"sequence identity" between two polypeptides or nucleic acid sequences indicates the number of residues that are identical between said sequences as a percentage of the total number of residues, and is calculated based on the size of the smaller of the compared molecules. When calculating the percentage identity, the sequences being aligned are matched in such a way as to produce a maximum match between the sequences, with the gaps in the match (if present) being resolved by a specific algorithm. Preferred computer program methods for determining identity between two sequences include, but are not limited to, GCG program packages including GAP, BLASTP, BLASTN and FASTA (Altschul et al., 1990, J. Mol. Biol. 215:403-410). The above procedures are publicly available from the International Center for Biotechnology Information (NCBI) and other sources. The well-known Smith Waterman algorithm can also be used to determine identity.

The term "Fc receptor" or "FcR" refers to a receptor that binds to the Fc region of an antibody. Human FcRs of natural sequence are preferred, and preferably receptors that bind to IgG antibodies (gamma receptors), which include the FcγRI, FcγRII and FcγRIII isoforms, as well as variants of these receptors. All other FcRs are included in the term "FcR". The term also includes the neonatal receptor (FcRn), which is responsible for the transport of maternal IgG to the fetus (Guyer et al, Journal of Immunology 117:587 (1976) and Kim et al, Journal of Immunology 24: 249 (1994)).

The term "neonatal Fc receptor", abbreviated as "FcRn", binds to the Fc region of IgG antibodies. The neonatal Fc receptor (FcRn) plays an important role in the metabolic fate of IgG-like antibodies in vivo. FcRn functions to rescue IgG from the lysosomal degradation pathway, thereby reducing its clearance in serum and lengthening its half-life. Therefore, the in vitroFcRn binding properties/characteristics of IgG are indicative of its in vivo pharmacokinetic properties in the circulation.

The term "effector function" refers to those biological activities attributable to the Fc region of an antibody, which vary from isotype to isotype. Examples of antibody effector functions include C1q binding and complement-dependent cytotoxicity (CDC), Fc receptor binding, antibody-dependent cytotoxicity (ADCC), antibody-dependent cellular phagocytosis (ADCP), cytokine secretion, immune complex-mediated uptake of antigen by antigen-presenting cells, cell surface receptors down-regulation (e.g. B-cell receptors) and B-cell activation.

The term "effector cell" refers to a leukocyte that expresses one or more FcRs and performs effector functions. In one aspect, said effector cells express at least FcγRIII and perform ADCC effector functions. Examples of human leukocytes that mediate ADCC include peripheral blood mononuclear cells (PBMCs), natural killer (NK) cells, monocytes, cytotoxic T cells and neutrophils. Effector cells can be isolated from natural sources, for example, blood. Effector cells are usually lymphocytes associated with effector phase and function to produce cytokines (helper T cells), kill cells infected by pathogens (cytotoxic T cells) or secrete antibodies (differentiated B cells).

"Immune cells" include cells that have a haematopoietic origin and play a role in the immune response. Immune cells include: lymphocytes, such as B cells and T cells; natural killer cells; and myeloid cells, such as monocytes, macrophages, eosinophils, mast cells, basophils and granulocytes.

"Antibody-dependent cell-mediated cytotoxicity" or "ADCC" refers to a form of cytotoxicity in which secreted Ig binds to Fcγ receptors presented on certain cytotoxic cells (e.g. NK cells, neutrophils and macrophages) allows these cytotoxic effector cells to specifically bind to target cells bearing antigens and subsequently kill said target cells using, for example, a cytotoxin. To assess the ADCC activity of the target antibody, in vitro ADCC assays can be performed, such as the in vitro ADCC assays documented in U.S. Pat. No. 5,500,362 or 5,821,337 or U.S. Pat. No. 6,737,056 (Presta). Useful effector cells for use in such assays include PBMCs and NK cells.

"Complement-dependent cytotoxicity" or "CDC" refers to the lysis of target cells in the presence of complement. The classic pathway for complement activation is initiated by binding the first component of the complement system (C1q) to an antibody (of the appropriate subclass) that binds to its corresponding antigen. To assess complement activation, a CDC assay can be performed, such as the CDC assay recited in Gazzano-Santoro et al., J. Immunol Methods 202: 163 (1996). For example in U.S. Pat. No. 6,194,551 B1 and WO1999/51642, there described polypeptide variants having altered amino acid sequences of the Fc region (polypeptides having a variant Fc region) and polypeptide variants having enhanced or reduced C1q binding.

"Human umbilical vein endothelial cells (HUVEC)" are isolated from umbilical cord veins and are generally used for physiological and pharmacological studies, e.g. for macromolecular transport, blood coagulation, angiogenesis and fibrinolysis. In particular, it can be used as a model for researches with respect to angiogenesis and other studies regarding VEGF-dependent signaling pathway (related endothelial growth factors).

Amino Acid Sequence of the Antibody of the Present Invention

The present invention used recombinant human VEGF165 protein to immunize rabbit, and then obtained the antibody clones VEGF165-R988 that specifically binds to recombinant human VEGF165 protein by phage display library screening. The nucleotide sequence encoding the heavy and light chain variable regions of the VEGF165-R988 scFv antibody was then inserted by PCR into pSTEP2 vector harboring nucleotide sequence encoding the rabbit IgG1 heavy chain constant region or the rabbit kappa light chain constant region, and cultured for expression. The high purity antibodies were purified using a protein A purification column. ELISA showed that the rabbit antibody VEGF165-R988 could effectively inhibit the binding of VEGF165 protein to VEGFR2 protein, and VEGF165-R988 could effectively neutralize the ability of VEGF165 to promote HUVEC proliferation.

Then, using the classic method for humanized CDR transplantation, the human antibody light chain or heavy chain variable region whose sequence is closer to the sequence of rabbit light chain or heavy chain variable region was elected as the template, the humanized light chain variable region (VL) and heavy chain variable region (VH) sequences were obtained by inserting each of the three CDRs (Table 1) of the rabbit antibody light chain or heavy chain into the variable regions of said human antibody. As the key sites of the rabbit framework region are essential for maintaining the stability of the CDR activity, the key sites were reverse-mutated to the corresponding sequence of rabbit antibody. VEGF-H988-10 light chain/heavy chain expression vector was obtained by whole gene synthesis, transfected into HEK-293 cells and cultured for expression, and the culture supernatant was purified using a protein A purification column to obtain high purity VEGF-H988-10 antibodies. To improve the affinity of VEGF-H988-10 antibodies, SDM libraries of CDR regions of heavy and light chain variable regions (including LCDR1, LCDR3, HCDR2 and HCDR3) were constructed, The above four mutant libraries were constructed in scFv form and were cloned into phage vector as scFv-gIII fusion protein; for each CDR, the CDR clones having optimal binding ability to soluble antigen VEGF were screened, and finally the VEGF-H988 Fab antibody fragment having optimized CDR affinity and stability was obtained.

Compared with the full-length antibody, antibodies in the form of Fab fragments have stronger penetrability and less toxic in terms of gastrointestinal perforation, hypertension and hemorrhage and do not stimulate the complement cascade reaction, thus reducing the risk of endophthalmitis and autoimmune inflammatory reactions.

Nucleic Acids of the Present Invention

The present invention also relates to nucleic acid molecules encoding antibodies or portions thereof of the present invention. The sequences of these nucleic acid molecules include, but are not limited to, SEQ ID NOs: 2-3, 4-7, 16-17, 20-21, 41-49 and 52-53.

The nucleic acid molecules of the present invention are not limited to the sequences disclosed herein, but also include variants thereof. Variants in the present invention may be described with reference to their physical properties in hybridization. It will be recognized by those of skill in the art that using nucleic acid hybridization techniques, nucleic acids can be used to identify their complements as well as their equivalents or homologues. It will also be recognized that hybridization can occur at less than 100% complementarity. However, given the appropriate choice of conditions, hybridization techniques can be used to distinguish said DNA sequences based on the structural relevance of the DNA sequence to a particular probe. For guidance on such conditions see Sambrook et al., Molecular Cloning: A Laboratory Manual, 2nd Ed. Cold Spring Harbor Press, Cold Spring Harbor, N. Y., 1989 and Ausubel, F. M., Brent, R., Kingston, R. E., Moore, D. D., Sedman, J. G., Smith, J. A., & Struhl, K. eds. (1995). Current Protocols in Molecular Biology. New York: John Wiley and Sons.

Recombinant Vectors and Expression

The present invention also provides recombinant constructs comprising one or more nucleotide sequences of the present invention. The recombinant construct of the present invention is constructed by inserting the nucleic acid molecule encoding the antibody of the present invention into a vector such as a plasmid, phagemid, phage or viral vector.

The antibodies provided herein can be prepared by recombinantly expressing nucleotide sequences encoding light and heavy chains or portions thereof in a host cell. In order to recombinantly express the antibody, the host cell may be transfected with one or more recombinant expression vectors carrying nucleotide sequences encoding the light and/or heavy chains or portions thereof, so that said light and heavy chains are expressed in said host cell. Standard recombinant DNA methodologies are used to prepare and/or obtain nucleic acids encoding heavy and light chains, to incorporate these nucleic acids into recombinant expression vectors and to introduce said vectors into host cells, e.g. Sambrook, Fritsch and Maniatis (eds.), Molecular Cloning; A Laboratory Manual, Second Edition, Cold Spring Harbor, N.Y., (1989), Ausubel, F. M. et al. (eds.) Current Protocols in Molecular Biology, Greene Publishing Associates, (1989) and those documented in U.S. Pat. No. 4,816,397 by Boss et al.

Suitable host cells are prokaryotic and eukaryotic cells. Examples of prokaryotic host cells are bacteria and examples of eukaryotic host cells are yeast, insect or mammalian cells. It should be understood that the design of an expression vector including the selection of a regulatory sequence is determined by a number of factors, such as the choice of host cell, the level of expression of the desired protein and whether the expression is constitutive or inducible.

Bacterial Expression

By inserting a structural DNA sequence encoding the desired antibody together with appropriate translation initiation and termination signals and a functional promoters into an operable reading frame, an expression vector for use in bacteria is constructed. The vector will contain one or more phenotypic selection markers and an origin of replication to ensure the maintenance of the vector and provide amplification in the host as needed. Suitable prokaryotic hosts for transformation include multiple species of *E. coli, Bacillus subtilis, Salmonella typhimurium,* as well as *Pseudomonas, Streptomyces* and *Staphylococcus.*

The bacterial vector may be, for example, phage-, plasmid- or phagemid-based. These vectors may contain selection markers and bacterial replication origins, which are derived from commercially available plasmids that usually contain elements of the well-known cloning vector pBR322 (ATCC 37017). After transforming an appropriate host strain and growing the host strain to an appropriate cell density, the selected promoter is de-repressed/induced by an appropriate method (for example, temperature change or chemical induction), and the cells are cultured for an additional time. The cells are usually harvested by centrifugation, disrupted by physical or chemical methods, and the resulting crude extract is retained for further purification.

In a bacterial system, a variety of expression vectors can be advantageously selected according to the intended use of the expressed protein. For example, when a large number of such proteins are to be produced for antibody production or for peptide library screening, for example, a vector that directs high-level expression of a fusion protein product to be easily purified may be required.

Mammalian Expression and Purification

Preferred regulatory sequences for expression in mammalian host cells include viral elements that direct high-level protein expression in mammalian cells, such as promoters and/or enhancers derived from cytomegalovirus (CMV) (e.g., CMV promoter/enhancer), promoters and/or enhancers of simian virus 40 (SV40) (e.g. SV40 promoter/enhancer), promoters and/or enhancers of adenovirus (e.g. adenovirus major late promoter (AdMLP)) and promoters and/or enhancers of polyoma virus. For a further description of viral regulatory elements and their sequences, see, for example, U.S. Pat. No. 5,168,062 by Stinski, U.S. Pat. No. 4,510,245 by Bell et al., and U.S. 4,968,615 by Schaffner et al. The recombinant expression vector may also include an origin of replication and a selection marker (see, for example, U.S. Pat. Nos. 4,399,216, 4,634,665 and 5,179,017 by Axel et al). Suitable selection markers include genes that confer resistance to drugs such as G418, hygromycin, or methotrexate to host cells into which the vector has been introduced. For example, the dihydrofolate reductase (DHFR) gene confers resistance to methotrexate, while the neo gene confers resistance to G418.

The transfection of the expression vector into host cells can be performed using standard techniques such as electroporation, calcium phosphate precipitation, and DEAE-dextran transfection.

Suitable mammalian host cells for expressing the antibodies provided herein include Chinese Hamster Ovary (CHO cells) [including dhfr-CHO cells, as described in Urlaub and Chasin, (1980) Proc. Natl. Acad. Sci. USA 77:4216-4220, DHFR selection markers are employed, as described in, for example, R. J. Kaufman and P. A. Sharp (1982) Mol. Biol. 159:601-621], NSO myeloma cells, COS cells, and SP2 cells.

The antibodies of the present invention can be recovered and purified from recombinant cell culture by known methods, including but not limited to, ammonium sulfate or ethanol precipitation, acid extraction, protein A affinity chromatography, protein G affinity chromatography, anion or cation exchange chromatography, phosphocellulose chromatography, hydrophobic interaction chromatography, affinity chromatography, hydroxyapatite chromatography, and lectin chromatography. High performance liquid chromatography ("HPLC") can be used for purification as well. See, for example, Colligan, Current Protocols in Immunology, or Current Protocols in Protein Science, John Wiley & Sons, NY, N.Y., (1997-2001), for example, Chapters 1, 4, 6, 8, 9, and 10, each of which is incorporated herein by reference in its entirety.

Characteristics and Functions of the Antibodies of the Present Invention

Characteristic analysis and function analysis of the humanized antibody VEGF-H988 Fab of the present invention were performed. The analyses showed that the antibody of the present invention has the following advantages:

(1) The binding ability of VEGF-H988 Fab to VEGF165 protein is similar to that of Lucentis® (Ranibizumab);
(2) The binding affinity of VEGF-H988 Fab to VEGF165 protein is better than that of Lucentis® (Ranibizumab); which is about 3.75 times that of Lucentis® (Ranibizumab);
(3) VEGF165-H988 Fab specifically binds to recombinant human VEGF165 protein and has no cross-binding with recombinant mouse mVEGF164 protein;
(4) VEGF165-H988 Fab can effectively inhibit the binding of VEGFR2 protein to VEGF165 protein, and its inhibitory ability is distinctly better than Lucentis® (Ranibizumab);
(5) The neutralizing activity of VEGF-H988 Fab is stronger than Lucentis® (Ranibizumab) at different concentrations of recombinant human VEGF165; its neutralizing activity is stronger than EYLEA® (Aflibercept) at high concentrations of VEGF165; its neutralizing activity is stronger than Bevacizumab and Brolucizumab at different concentrations of VEGF165, but comparable to the activity of Conbercept.

Uses

The antibodies of the present invention can be used to treat diseases associated with angiogenesis, including ocular diseases characterized by choroidal neovascularization, including but not limited to the occurrence of age-related macular degeneration (AMD), diabetic macular edema (DME), retinal edema, degenerative myopia, and choroidal neovascularization (CNV).

Pharmaceutical Compositions

Antibodies of the present invention may be prepared with at least one other agent (e.g. a stable compound) to form pharmaceutical compositions comprising an antibody of the present invention and one or more pharmaceutically acceptable carriers, diluents or excipients. Optionally, the pharmaceutical compositions may contain additional therapeutic agents.

Kits

The present invention also relates to a pharmaceutical package and a kit comprising one or more containers, said containers contains the foregoing pharmaceutical compositions of the present invention. Accompanied with such containers may be specifications in the form prescribed by the governmental agency governing the manufacture, use or distribution of the drug or biological product, which reflect approval for human administration by the agency in which said product is manufactured, used or distributed.

Preparation and Storage

The pharmaceutical compositions of the present invention can be prepared in a manner known in the art, for example by conventional mixing, dissolution, granulation, pastille preparation, grinding, emulsification, encapsulation, embedding or lyophilization methods.

Having already prepared pharmaceutical compositions comprising compounds of the present invention formulated in an acceptable carrier, they may be placed in appropriate containers and labeled for the treatment of the condition indicated. Such labeling would include the amount, frequency and administration routes of the drug.

Combinations

The pharmaceutical compositions comprising the antibodies of the present invention described above are also combined with one or more other therapeutic agents, such as antineoplastic agents, wherein the resulting combination does not cause unacceptable adverse effects.

The following examples facilitate a better understanding of the present invention, but do not intend to limit the present invention. The experimental methods in the following examples, unless otherwise specified, are all conventional methods. The experimental materials used in the following examples, unless otherwise specified, were purchased from conventional biochemical reagent distributors.

EXAMPLES

Example 1: Screening of Rabbit Antibodies that Block the Binding of VEGF165 to VEGFR2 Using Antibody Phage Display Library 1.1 Immunization of Rabbits Recombinant human VEGF165 protein (from Sino Biological, Inc, Cat. 11066-HNAH) was used to immunize rabbits. The amino acid sequence of the extracellular region Met1-Arg191 of the human VEGF165 protein (UniProt P15692-4) is SEQ ID NO: 1.

The detailed method was: The recombinant human VEGF165 protein was mixed with Freund's adjuvant, the rabbits were subcutaneously immunized with the mixture for 4 times at intervals of 3 weeks, 2 weeks and 2 weeks respectively, at a dose of 500 µg each time. Since the fourth immunization, blood was collected 4 days after immunization via the medial canthal plexus of the eye. The serum titer of rabbit anti-VEGF165 was measured by ELISA using coated recombinant human VEGF165 protein. The titer of the serum from the fifth immunization reached 1:250000, and the rabbits were boosted intravenously with 25 µg recombinant human VEGF165 protein 9 weeks after the fifth immunization. 7 days later, the mice were executed and the spleen tissue was removed and frozen in liquid nitrogen.

1.2 Screening of Antibody Phage-Display Library

RNA was extracted from rabbit spleen tissue using TriPure Isolation Reagent (from Roche, Cat. No. 11 667 165 001), and cDNAs were obtained by reverse transcription of RNA using a reverse transcription kit (from Invitrogen Cat. No. 18080-051). 10 pairs of primers were designed to amplify the sequence of the light chain variable region of the rabbit antibody and 4 pairs of primers were designed to amplify the sequence of the heavy chain variable region (Barbas C F et al., CSHL Press. 2004). The sequences encoding the light and heavy chain variable regions of the rabbit antibody were assembled into the nucleotide sequence encoding scFv by overlapping extension PCR, the light and heavy chain variable regions were linked (Jones S T et al., Bio/technology. 1991; 9(1): 88) by the following linker:

(SEQ ID NO: 2)
TCTAGTGGTGGCGGTGGTTCGGGCGGTGGTGGAGGTGGTAGTTCTAGATCT

TCC (SSGGGGSGGGGGSSRSS);

Then enzymatically ligated into the phage vector pComb3× (from Sino Biological, Inc.) by restriction endonuclease Sfi I (from Fermentas), and was electrotransformed into the X-Blue competent cells to construct the rabbit phage-display scFv antibody library. The recombinant human VEGF165 protein was coated on an ELISA plate, and a phage library enriched with anti-VEGF165 positive antibodies was screened according to the process of phage antibody panning process (O'Brien, P M, & Aitken, R. (Eds.), Springer Science & Business Media. 2002; ISBN: 9780896037113). Single colony phages were selected from the enriched library for expression, and their binding to recombinant human VEGF165 protein was detected by ELISA. The antibody clone that specifically bind to recombinant human VEGF165 was selected and was sent to a sequencing service company for sequencing to obtain the nucleotide sequence (SEQ ID NO: 3) of the VEGF165-R988 scFv antibody.

1.3 Production of Rabbit Antibodies Targeting VEGF165

The nucleotide sequence encoding the heavy chain variable region of the VEGF165-R988 scFv antibody was PCR amplified and inserted into the Sca I+Kpn I (Fermentas) digested pSTEP2 vector harboring nucleotide sequences encoding the heavy chain signal peptide (SEQ ID NO: 43) and rabbit heavy chain IgG1 constant region (SEQ ID NO: 6) by in-fusion method, thus the heavy chain (SEQ ID NO: 52) expression vector was obtained. The nucleotide sequence encoding the light chain variable region of the VEGF165-R988 scFv antibody was PCR amplified and inserted into the Sca I+BamH I (Fermentas) digested pSTEP2 vector harboring nucleotide sequences encoding the light chain signal peptide (SEQ ID NO: 44) and rabbit kappa light chain constant region (SEQ ID NO: 7) by in-fusion method, thus the light chain (SEQ ID NO: 53) expression vector was obtained. The recombinant plasmids were extracted, and transfected into HEK-293 cells and cultured for expression for 7 days, and the culture supernatant was purified by a protein A purification column to obtain high-purity antibodies.

Primers for amplifying the heavy chain variable region:

| F1 | ACCAGGGTGCTGAGTCAGTCGGTGGAGGAGTCC (SEQ ID NO: 56) |
| R1 | TGTGACCAGGGTACCTGGGCCCCA (SEQ ID NO: 57) |

Primers for amplifying the light chain variable region:

| F2 | ACAGGAGTGCATAGTGAGCTCGATCTGACCCAGAC (SEQ ID NO: 58) |
| R2 | GGTGCAACTGGATCCCCTTTGACGACCACCTCGGT (SEQ ID NO: 59) |

1.4 Function analysis of rabbit antibodies targeting VEGF165

1.4.1 Rabbit Antibody Blocks VEGF165 from Binding to VEGFR2-his

VEGF165 protein (from SinoBiological, Inc.) at a concentration of 1 µg/mL was coated on a 96-well plate in 100 µL/well overnight at 4° C. The plate was washed the next day and blocked at room temperature for 1 h. 100 µL of 5 µg/mL VEGFR2-biotin protein (from SinoBiological, Inc.) and antibody VEGF-R988 at different concentrations were added and co-incubated. The plate was washed to remove unbound antibodies, incubated with Streptavidin/HRP (from Beijing ZSGB-Bio Co., Ltd.) and then repeatedly washed, and the chromogenic substrate solution was added for color development. $OD_{450}$ was measured after the color development was ended. Taking the concentration of the rabbit antibody targeting VEGF165 as the horizontal coordinate and the inhibition rate PI % as the vertical coordinate, the graphPad Prism 6.0 software was used for data analysis and generating a curve chart. Inhibition rate (%)=($OD_{blank}$−$OD_{sample}$)/$OD_{blank}$×100%, where $OD_{blank}$ indicates the OD value of the wells with only VEGFR2-biotin added but no rabbit antibody, and $OD_{sample}$ indicates the OD value of the wells with both VEGFR2-biotin and rabbit antibodies added.

As shown in FIG. 1, the antibody VEGF-R988 can effectively bind to the coated VEGF165 protein, and inhibit the binding of VEGFR165 protein to VEGFR2 protein.

1.4.2 Rabbit Antibody Inhibits the VEGF165-Induced HUVEC Proliferative Effect

The effect of said rabbit antibody neutralizing the VEGF165-induced umbilical vein endothelial cells proliferation was detected by using the WST-8 method. Human umbilical vein endothelial cells HUVEC were inoculated into a 96-well plate at 4×10³ cells/well, cultured in M199 medium containing 10% FBS and 5% L-Gln for 4 h, and then different concentrations of antibody VEGF-R988 were added in 50 L/well, then VEGF-165 at a final concentration of 10 ng/ml was added in 10 µL/well, the 96-well plate was incubated in a 37° C., 5% $CO_2$ cell incubator for 3 days, and the blank well B (no cells), negative control M (cells inoculated, no antibody sample, VEGF-165 added) and M' (cells inoculated, no antibody sample and no VEGF-165) were used. After incubation, 10 µL/well of WST-8 chromogenic solution was added, and the 96-well plate was incubated in $CO_2$ incubator for color development, $OD_{450}$ and $OD_{630}$ were measured with a microplate reader after the color development was ended the reading value was ($OD_{450}$-$OD_{630}$), and the neutralization rate of the antibody was calculated as the OD value for each group was defined as the reading value of the group minus the reading value of blank well B, the neutralization rate %=(OD value of negative control M−OD value of sample)/(OD value of negative control M−OD value of M')×100%. The standard curve was calculated using the automatic analysis function of the statistical software GraphPad Prism, taking the antibody sample concentration as the horizontal coordinate and the neutralization rate as the vertical coordinate, and the four-parameter logistic regression equation was used to fit the standard "S" curve to calculate the median effective concentration ($EC_{50}$) of the antibody sample.

Figure 2:
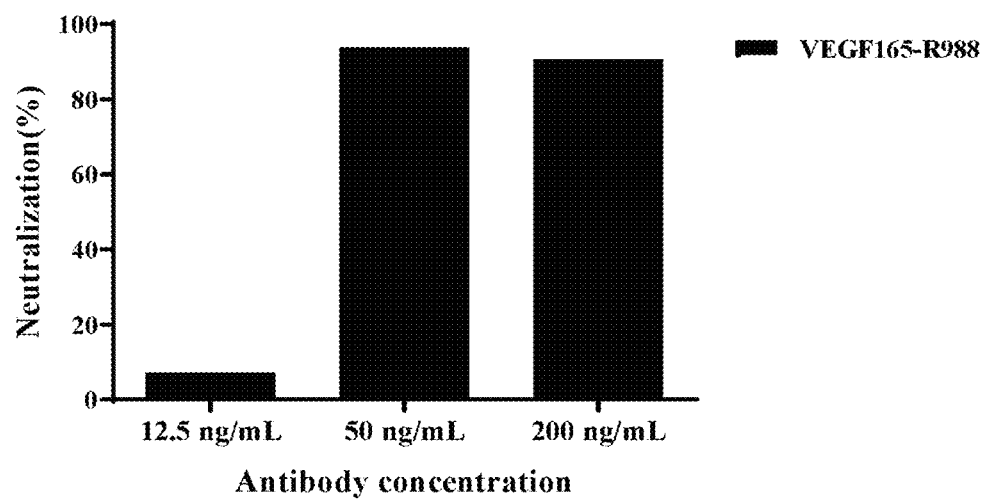
FIG. 2 shows that VEGF165 rabbit antibody VEGF-R988 neutralizes the VEGF165-HUVEC proliferation effect.

The results shown in FIG. 2 demonstrate that antibody VEGF-R988 effectively reduce the ability of VEGF165 to promote HUVEC proliferation.

Example 2: Humanization, Modification of Rabbit Antibody VEGF-R988 and Production of its Fab Fragments 2.1 Determination of the CDRs of the Light and Heavy Chains of Rabbit Antibody VEGF-R988

Based on the nucleotide sequence of the VEGF-R988 scFv antibody determined in Example 1.2, the amino acid sequences of the heavy chain and light chain variable regions of the VEGF-R988 scFv were deduced, see SEQ ID NOs: 8/9.

Refer to the Kabat index and IMGT numbering schemes, the amino acid sequence of each of the three CDRs of the light and heavy chains of the rabbit antibody VEGF-R988-scFv were determined, see Table 1. The aforementioned respective three CDRs of the light chain and the heavy chain were transplanted into the humanized antibody VEGF-R988-scFv in the subsequent steps, see Example 2.2.

TABLE 1

| CDR sequences of VEGF-R988 light chain and heavy chains | |
|---|---|
| Name | Sequences |
| LCDR1 | QSSQTIYANRRLA (SEQ ID NO: 10) |
| LCDR2 | GASTLAS (SEQ ID NO: 11) |

TABLE 1-continued

CDR sequences of VEGF-R988 light chain and heavy chains

| Name | Sequences |
|---|---|
| LCDR3 | AGYKSYDGDDVG (SEQ ID NO: 12) |
| HCDR1 | GIDLSSYAISWV (SEQ ID NO: 13) |
| HCDR2 | YIWNAGNTYYASWAKG (SEQ ID NO: 14) |
| HCDR3 | ARGTLGDYNGMDP (SEQ ID NO: 15) |

2.2 the Humanization of Rabbit Antibody VEGF-R988 by CDR Transplantation

The humanization of the rabbit antibody was performed using the classic humanization method of CDR transplantation. The human antibody light or heavy chain variable region, whose sequence is closer to the sequence of rabbit light or heavy chain variable region, was elected as the template, and each of three CDRs (Table 1) from the rabbit light or heavy chain was inserted into the variable regions of the human antibody to obtain the humanized light chain variable region (VL) or heavy chain variable region (VH) sequences respectively. The human template for the light chain variable region of VEGF-R988 is IGKV1-27*01, which is 65.30% homologous to the light chain of VEGF-R988, and the human template for the heavy chain variable region is IGHV4-4*08, which is 53.20% homologous to the heavy chain of VEGF-R988.

2.3 Reverse-Mutations at the Framework Region of the Humanized Variable Region

As some key amino acids in the rabbit-derived framework region are essential to maintain the CDR activity, the key amino acids were reverse-mutated to the corresponding rabbit antibody amino acid sequences, the following sites were reversely mutated: in the light chain, Position 1 was reversely mutated to E, Position 2 was reversely mutated to L, Position 4 was reversely mutated to L, and Position 63 was reversely mutated to K; while in the heavy chain, Position 3 was reversely mutated to V, Position 37 was reversely mutated to V, Position 47 was reversely mutated to Y, Position 78 was reversely mutated to V, Position 79 was reversely mutated to D, and Position 91 was reversely mutated to F; all the above sites were numbered by reference to the Kabat numbering scheme. The humanized antibody VEGF-H988-10 was obtained by CDR humanized transplantation and framework region reverse-mutations.

2.4 Production of Humanized Monoclonal Antibody VEGF-H988-10 and CDR Affinity Modification VEGF-H988-10 heavy chain variable region (SEQ ID NO: 20) was obtained by the whole gene synthesis method, and then inserted, by in-fusion method, into ScaI+NheI (Fermentas) digested pSTEP2 vector harboring the nucleotide sequence encoding the heavy chain signal peptide (SEQ ID NO: 43) and the nucleotide sequence encoding the human IgG1 constant region (SEQ ID NO: 47), to obtain the VEGF-H988-10 heavy chain (SEQ ID NO: 16) expression vector. VEGF-H988-10 light chain variable region (SEQ ID NO: 21) was obtained by the whole gene synthesis method, and then inserted, by in-fusion method, into ScaI+BsiW I (Fermentas) digested pSTEP2 vector harboring the nucleotide sequence encoding the light chain signal peptide (SEQ ID NO: 44) and the nucleotide sequence encoding the human kappa constant region (SEQ ID NO: 48) to obtain the VEGF-H988-10 light chain (SEQ ID NO: 17) expression vector. Plasmids were extracted and transfected into HEK-293 cells, the cells were cultured for 7 days. The culture supernatant was purified with a protein A purification column to obtain high-purity antibodies.

Primers for Whole Gene Synthesis of the Heavy Chain Variable Region

| | |
|---|---|
| F3 | CCACAGGAGTGCATAGTGAACTCCAACTTACCCAGAGCCCATCCTCCCTG (SEQ ID NO: 60) |
| R3 | CCTGTCTCCCACAGAGGCAGACAGGGAGGATGG (SEQ ID NO: 61) |
| F4 | TCTGTGGGAGACAGGGTGACCATCACTTGTCAG (SEQ ID NO: 62) |
| R4 | GGCATAGATGGTCTGGCTGGACTGACAAGTGAT (SEQ ID NO: 63) |
| F5 | CAGACCATCTATGCCAACAGGAGACTGG (SEQ ID NO: 64) |
| R5 | TTCTGTTGATACCAAGCCAGTCTCCTGT (SEQ ID NO: 65) |
| F6 | TTGGTATCAACAGAAGCCTGGCAAGGTG (SEQ ID NO: 66) |
| R6 | AAATCAGCAGTTTTGGCACCTTGCCAGG (SEQ ID NO: 67) |
| F7 | CAAAACTGCTGATTTATGGAGCCAGCAC (SEQ ID NO: 68) |
| R7 | CACTCCAGATGCCAGGGTGCTGGCTCCA (SEQ ID NO: 69) |
| F8 | CTGGCATCTGGAGTGCCAAGCAGGTTCAAGGGC (SEQ ID NO: 70) |
| R8 | GAAGTCTGTGCCAGAGCCAGAGCCCTTGAACCT (SEQ ID NO: 71) |
| F9 | TCTGGCACAGACTTCACCCTGACCATCTCCTCC (SEQ ID NO: 72) |
| R9 | AGCCACATCCTCAGGTTGGAGGGAGGAGATGGT (SEQ ID NO: 73) |
| F10 | CCTGAGGATGTGGCTACCTACTACTGTGCTGGC (SEQ ID NO: 74) |
| R10 | ATCTCCATCATAGGACTTGTAGCCAGCACAGTA (SEQ ID NO: 75) |
| F11 | TCCTATGATGGAGATGATGTGGGCTTTGGAGGA (SEQ ID NO: 76) |
| 11R | GGTGCAGCCACCGTACGCTTAATCTCCACCTTGGTGCCTCCTCCAAAGCC (SEQ ID NO: 77) |

Primers for Whole Gene Synthesis of the Light Chain Variable Region

| | |
|---|---|
| F12 | GCTACCAGGGTGAGTCAGTCTGTCCAGGAGTCTGGACCTGGACTGGTG (SEQ ID NO: 78) |
| R12 | GGACAGGGTCTCAGATGGCTTCACCAGTCCAGG (SEQ ID NO: 79) |

| | |
|---|---|
| F13 | TCTGAGACCCTGTCCCTGACTTGTACTGTGTCT (SEQ ID NO: 80) |
| R13 | ATAGGAGGACAGGTCAATGCCAGACACAGTACA (SEQ ID NO: 81) |
| F14 | GACCTGTCCTCCTATGCCATCTCCTGGGTGA (SEQ ID NO: 82) |
| R14 | CCCTTGCCAGGAGGTTGTCTCACCCAGGAGA (SEQ ID NO: 83) |
| F15 | ACCTCCTGGCAAGGGATTGGAATACATTGGC (SEQ ID NO: 84) |
| R15 | TGCCAGCATTCCAGATGTAGCCAATGTATTC (SEQ ID NO: 85) |
| F16 | TCTGGAATGCTGGCAACACCTACTATGCCTC (SEQ ID NO: 86) |
| R16 | CACCCTGCCCTTAGCCCAGGAGGCATAGTAG (SEQ ID NO: 87) |
| F17 | GCTAAGGGCAGGGTGACCATCTCTGTGGACACC (SEQ ID NO: 88) |
| R17 | CAGGTCCACCTGGTTCTTGCTGGTGTCCACAGA (SEQ ID NO: 89) |
| F18 | AACCAGGTGGACCTGAAACTGTCCTCTGTGACA (SEQ ID NO: 90) |
| R18 | GTAGACTGCTGTGTCTGCTGCTGTCACAGAGGA (SEQ ID NO: 91) |
| F19 | GACACAGCAGTCTACTTCTGTGCCAGGGGCACC (SEQ ID NO: 92) |
| R19 | CATCCCATTGTAGTCTCCCAGGGTGCCCCTGGC (SEQ ID NO: 93) |
| F20 | GACTACAATGGGATGGACCCATGGGACCTGGC (SEQ ID NO: 94) |
| R20 | GGGCCCTTGGTGCTAGCGCTGGACACTGTCACCAGGGTGCCA GGTCCCCA (SEQ ID NO: 95) |

To improve the affinity of VEGF-H988-10, SDM libraries of CDR regions of heavy and light chain variable regions (including three saturated mutation libraries of LCDR1, LCDR3, and HCDR2) were constructed; Meanwhile, to improve the chemical stability of the antibody, the amino acid residues capable of undergoing deamidation or isomerization should be modified to another amino acid residue. The deamidation of asparagine can occur in, such as NG, NS, NA, NT, etc., leading to the generation of isoaspartic residues, which affects the stability or biological function of the antibody. The VEGF-H988 variable region HCDR3 has a deamidation-susceptible site, thus SDM libraries were constructed to improve the chemical stability and biological function of the antibody. The above four mutant libraries were constructed in scFv form and were cloned into phage vector as scFv-gIII fusion protein; for each CDR, the CDR clones having optimal binding ability to soluble antigen VEGF were screened, and finally the antibody VEGF-H988 having optimized CDR affinity and stability was obtained. The sequences of VEGF-H988 light and heavy chain CDRs are shown in Table 2.

TABLE 2

CDR sequences of VEGF-H988 light chain and heavy chains

| Name | Sequences |
|---|---|
| LCDR1 | QSSKFLWQGRRLA (SEQ ID NO: 24) |
| LCDR2 | GASTLAS (SEQ ID NO: 25) |
| LCDR3 | AGYKSYDGDVVG (SEQ ID NO: 26) |
| HCDR1 | GIDLSSYAIS (SEQ ID NO: 27) |
| HCDR2 | YIWNDLFTYYASWAKG (SEQ ID NO: 28) |
| HCDR3 | ARGTLGDYGGMDP (SEQ ID NO: 29) |

2.5 Production of Humanized VEGF-H988 Fab Fragments

The nucleotide sequence (SEQ ID NO: 42) encoding the aforementioned VEGF-H988 Fab light chain and the signal peptide, which contains the following nucleotide sequences encoding light chain signal peptide (SEQ ID NO: 44), the humanized antibody light chain variable region (SEQ ID NO: 46) and the human antibody kappa light chain constant region (SEQ ID NO: 48) connected in order, was PCR amplified and inserted into the self-developed pGS vector (Kpn I+Xba I) by in-fusion method, and the correct plasmids were verified by sequencing. The nucleotide sequence (SEQ ID NO: 41) encoding the VEGF-H988 Fab heavy chain and the signal peptide, which contains the following nucleotide sequences encoding heavy chain signal peptide (SEQ ID NO: 43), the humanized antibody heavy chain variable region (SEQ ID NO: 45) and the human IgG1 heavy chain CH1 constant region (SEQ ID NO: 49) connected in order, was PCR amplified and inserted into pGS vector (NheI+Not I) which had been verified to contain the light chain correctly by in-fusion method, and the correct vectors expressing both light and heavy chains of VEGF-R988 Fab were verified by sequencing. These expression vectors are eukaryotic expression vectors containing the GS genes as the selection marker and the expression elements of the antibody light and heavy chains. These expression vectors were transfected into CHO-K1-GS-deficient cells and VEGF-H988 Fab high expression cell lines were obtained by MSX screening. The clones with high antibody expression were selected by ELISA assay, and the high expression cell lines were selected by taking into account both the cell growth status and the key quality characteristics for antibody drugs. A serum-free suspension culture was used to culture the VEGF-H988 Fab producing CHO cell line to obtain high purity and quality VEGF-H988 Fab fragments.

Example 3: Characteristic Analysis of Humanized VEGF-H988 Fab Fragments 3.1 Characteristic Analysis of VEGF-H988 Fab Fragments Binding to VEGF165

3.1.1 VEGF-H988 Fab Fragments Specifically Bind to VEGF165

Recombinant human VEGF165 protein (from SinoBiological, Inc.) in different concentrations (0.15 ng/ml, 0.46 ng/mL, 1.37 ng/ml, 4.12 ng/mL, 12.35 ng/ml, 37.04 ng/ml, 111.11 ng/ml, 333.33 ng/ml, 1000 ng/mL and 3000 ng/ml) was coated on a 96-well plate overnight at 4° C. in 100 µL/well. The plate was washed the next day and blocked at room temperature for 1 h. After incubation with 100 µL of 1 µg/mL of VEGF165-H988 Fab fragments, Lucentis® (Ranibizumab; from Novartis) or negative control H7N9-R1

Fab fragments (from Sino Biological, Inc.) respectively, the plate was washed to remove unbound antibodies, then incubated with goat F(ab') 2 anti-human IgG F(ab') 2/HRP (from Jackson ImmunoResearch Laboratories, Inc.) and washed repeatedly, and the chromogenic substrate solution was added for color development. $OD_{450}$ was measured after the color development was ended. Taking the concentration of recombinant human VEGF165 protein as the horizontal coordinate and the $OD_{450}$ value as the vertical coordinate, the graphPad Prism 6.0 software was used to fit an "S" curve chart and the binding of the antibody fragments to recombinant human VEGF165 protein was analyzed.

Figure 3:
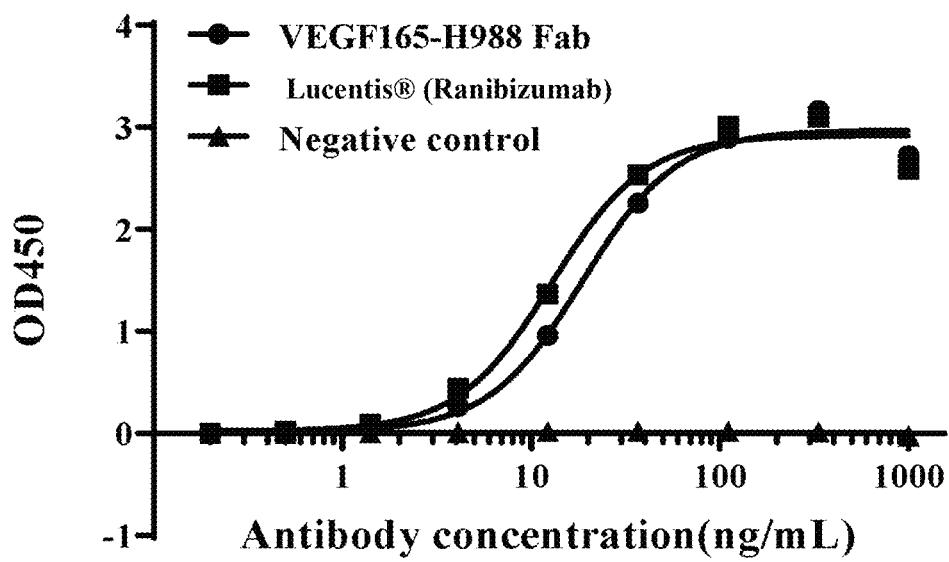
FIG. 3 shows the binding of humanized antibody VEGF-H988 Fab to VEGF165, detected by ELISA.

The results shown in FIG. 3 demonstrate that the $EC_{50}$ value of humanized VEGF165-H988 Fab fragments specifically binding to recombinant human VEGF165 is 18.75 ng/ml, $R^2=0.993$; the $EC_{50}$ value of Lucentis® (Ranibizumab) binding to recombinant human VEGF165 is 12.87 ng/ml, $R^2=0.989$. This indicates that the ability of VEGF165-H988 Fab binding to recombinant human VEGF165 protein is similar to that of Lucentis® (Ranibizumab). The negative control H7N9-R1 Fab fragments have no binding ability to recombinant human VEGF165 protein.

3.1.2 Assay of the Binding Affinity of VEGF-H988 Fab Fragments to VEGF165 Protein The affinities of VEGF165-H988 Fab fragments and Lucentis® (Ranibizumab) were measured at multiple concentrations using streptavidin-coated Sensor and immobilized biotin-labeled VEGF165 protein.

The recombinant human VEGF165 protein was first labeled with biotin in a molar ratio of 1:2 as the following process: the recombinant VEGF165 protein buffer (20 mM Tris, 150 mM NaCl, pH 8.0) was replaced with PBS through ultrafiltration in a 5000 MW ultrafiltration centrifugal tube, and 567.57 µg of protein was obtained as measured by UV quantification, and the resulting proteins were mixed with 20 mM biotin solution in a 1:2 molar ratio for incubation for 30 min at room temperature in the dark, then filtered again in a 5000 MW ultrafiltration centrifugal tube to remove the unlabeled biotin. After UV quantification, the biotin-labeled proteins were obtained by adding an equal volume of glycerol and a final concentration of 0.1% BSA. The concentration of the VEGF165 protein was 2.08 mg/mL, detected by UV.

Then the affinities of VEGF165-H988 Fab fragments and Lucentis® (Ranibizumab) in different concentrations to biotinylated recombinant human VEGF165 proteins were measured, and the obtained KD values were the final affinities.

The results shown in Table 3 demonstrate that, the binding affinity KD value of VEGF-H988 Fab fragments with recombinant human VEGF165 protein was 1.54E-10 (M), the binding constant $k_{on}$ value was 2.74E+05 (1/Ms), and the dissociation constant $k_{dis}$ value was 4.21E-05 (l/s); the binding affinity KD value of Lucentis® (Ranibizumab) with VEGF165 protein was 5.78E-11 (M), with a binding constant $k_{on}$ value of 5.36E+04 (1/Ms) and a dissociation constant $k_{dis}$ value of 3.10E-05 (1/s), as shown in Table 3. The results showed that the affinity of VEGF-H988 Fab fragments was stronger than that of Lucentis® (Ranibizumab), which was about 3.75 times stronger that of Lucentis® (Ranibizumab). Thus VEGF-H988 Fab fragments have a stronger ability to bind VEGF165 protein than Lucentis® (Ranibizumab).

TABLE 3

The binding affinities of VEGF-H988-48-IgG1(Fab-N103G) and Lucentis® (Ranibizumab)with recombinant protein VEGF165

| Sample | KD(M) | $K_{on}$(1/Ms) | $K_{dis}$(1/2) |
|---|---|---|---|
| VEGF-H988 Fab antibody | 1.54E-10 | 2.74E+05 | 4.21E-05 |
| Lucentis® (Ranibizumab) | 5.78E-10 | 5.36E+04 | 3.10E-05 |

3.1.3 Determination of Species Cross Reactivity of VEGF165-H988 Fab Fragments

Recombinant human VEGF165 proteins or recombinant mouse mVEGF164 proteins (from Sino Biological, Inc.) were diluted to 0.1 µg/mL, 1 µg/mL and 10 µg/mL, respectively, and coated on a 96-well plate overnight at 4° C. in 100 µL/well. The plate was washed the next day, blocked at room temperature for 1 h. 100 µL of VEGF165-H988 Fab fragments, Lucentis® (Ranibizumab) or negative control H7N9-R-Fab was added respectively in a concentration of 2 µg/mL and incubated for 1 h. The plate was washed to remove unbound antibodies. The plate was incubated with goat F(ab')2 anti-human IgG F(ab')2/HRP (Jackson ImmunoResearch Laboratories, Inc.) and then repeatedly washed, and the chromogenic substrate solution was added for color development. $OD_{450}$ was measured after the color development was ended. Taking the protein concentration as the horizontal coordinate and the $OD_{450}$ value as the vertical coordinate, the graphPad Prism 6.0 software was used for generating a bar chart.

Figure 4:
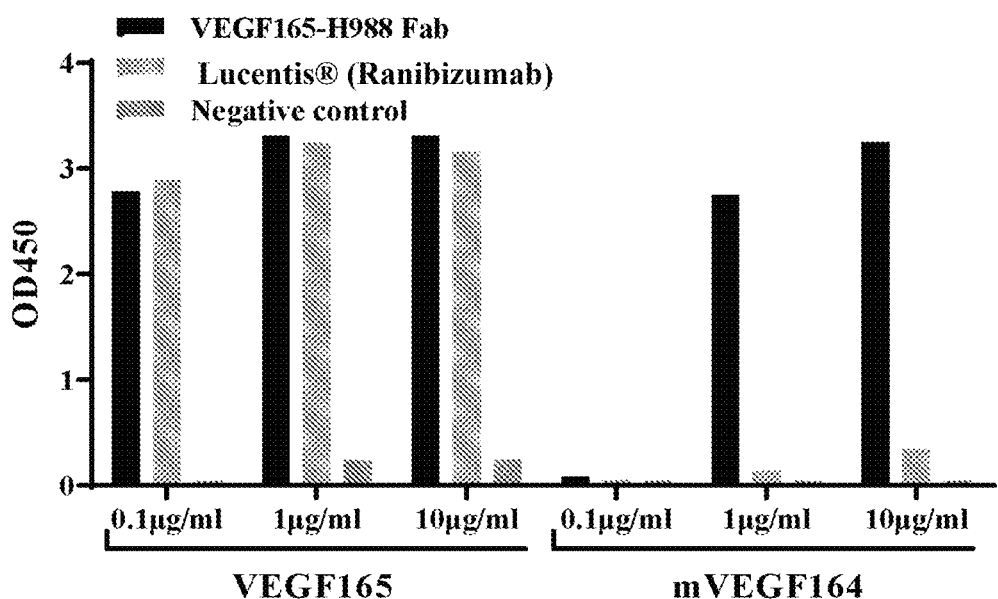
FIG. 4 shows the species cross binding of VEGF-H988 Fab to mVEGF164, detected by ELISA.

The results shown in FIG. 4 demonstrate that VEGF165-H988 Fab fragments bind to recombinant human VEGF165 protein specifically and show cross-binding with recombinant mouse mVEGF164 protein; while Lucentis® (Ranibizumab) shows no cross-binding with recombinant mouse mVEGF164 protein.

3.2 Receptor Blocking Properties of VEGF-H988 Fab Fragments

VEGF165 protein at a concentration of 1 µg/mL was coated on a 96-well plate in 100 µL/well overnight at 4° C. The plate was washed the next day and blocked at room temperature for 1 h. 100 µL of 2 µg/mL VEGFR2-his protein (from SinoBiological, Inc.) was added in each well and different concentrations of humanized VEGF-H988 Fab fragments, Lucentis® (Ranibizumab) s or negative control H7N9-R1-Fab (from SinoBiological, Inc.) was added respectively and co-incubated. The plate was washed to remove unbound antibodies. The plate was incubated with C-his-R023/HRP and then repeatedly washed, and the chromogenic substrate solution was added for color development. $OD_{450}$ was measured after the color development was ended, with each group tested in duplicate. Taking the concentration of the antibody as the horizontal coordinate and the inhibition rate PI % as the vertical coordinate, the graphPad Prism 6.0 software was used for data analysis and generating a curve chart to calculate the IC50 value. Inhibition rate (%)=($OD_{blank}$-$OD_{sample}$)/$OD_{blank}$×100%, where $OD_{blank}$ indicates the OD value of the wells with only VEGFR2-his added but no humanized antibody added, and OD sample indicates the OD value of the wells with both VEGFR2-his and the humanized antibodies added.

Figure 5:
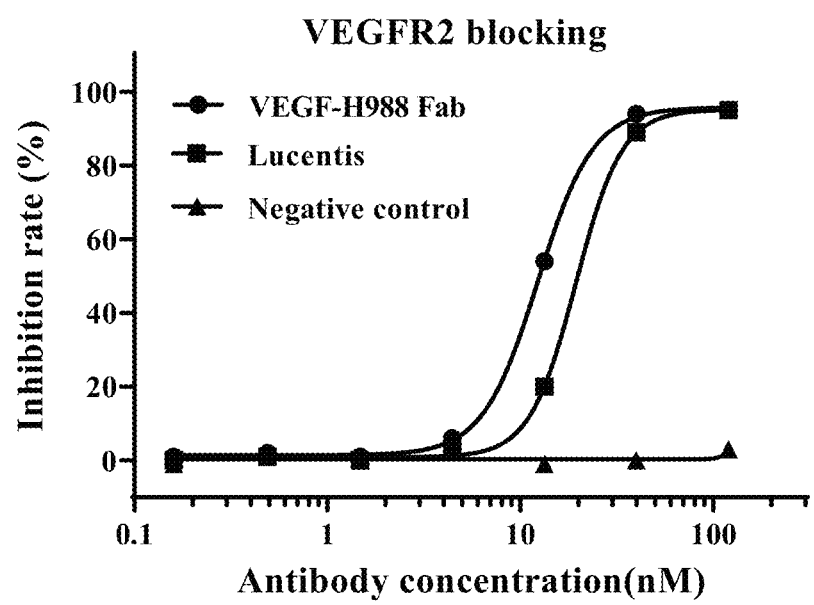
FIG. 5 shows that the antibody VEGF-H988 Fab blocks the binding of VEGF165 to VEGFR2 protein, detected by ELISA.
Figure 6A:
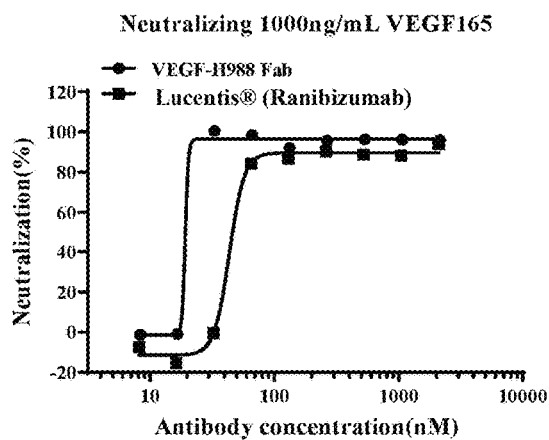
FIG. 6A shows the effect of antibody VEGF-H988 Fab and Lucentis® (Ranibizumab) in neutralizing VEGF165 at a concentration of 1,000 ng/mL.
Figure 6B:
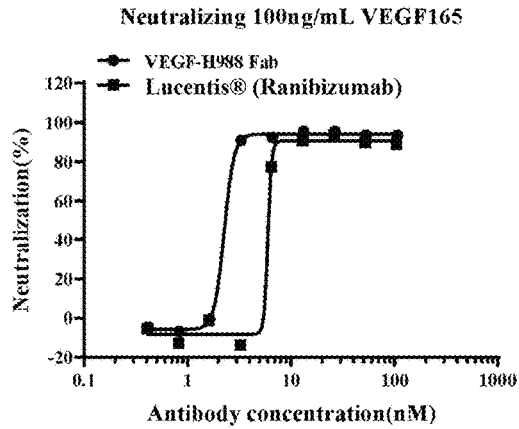
FIG. 6B shows the effect of antibody VEGF-H988 Fab and Lucentis® (Ranibizumab) in neutralizing VEGF165 at a concentration of 100 ng/mL.
Figure 6C:
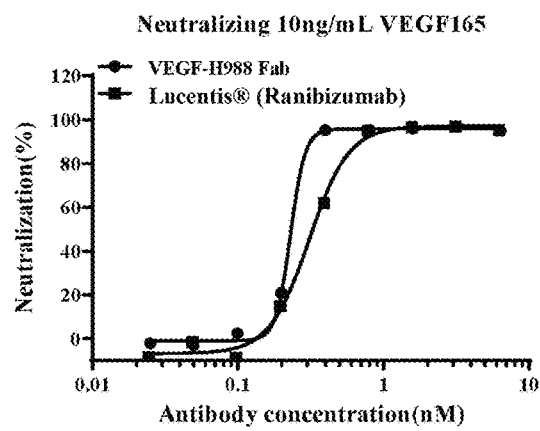
FIG. 6C shows the effect of antibody VEGF-H988 Fab and Lucentis® (Ranibizumab) in neutralizing VEGF165 at a concentration of 10 ng/mL.
Figure 6D:
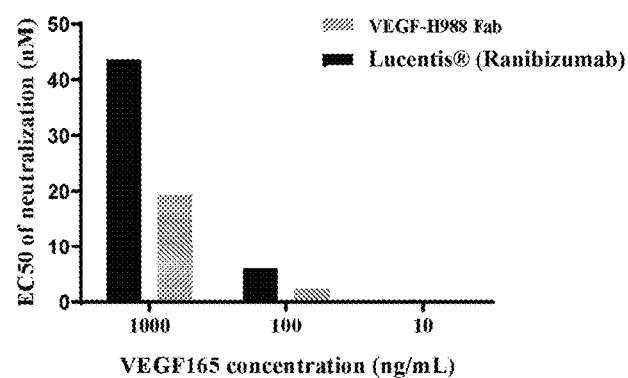
FIG. 6D shows EC50 values of neutralization calculated from the experiments from FIGS. 6A-6C.
Figure 6E:
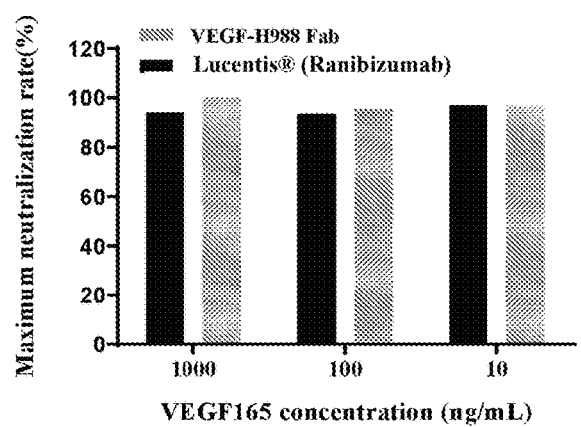
FIG. 6E shows the maximum neutralization rates from the experiments from FIGS. 6A-6C.
Figure 7A:
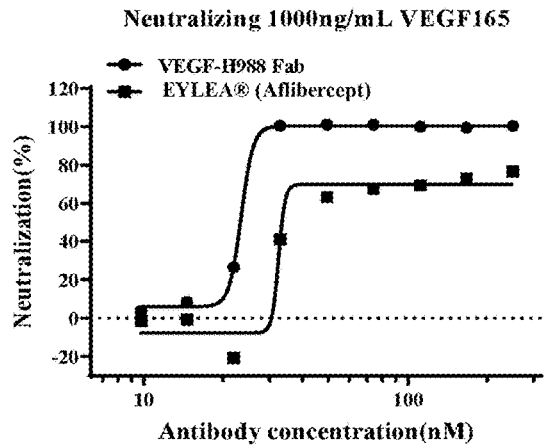
FIG. 7A shows the effect of antibody VEGF-H988 Fab and EYLEA® (Aflibercept) in neutralizing VEGF165 at a concentration of 1,000 ng/mL.
Figure 7B:
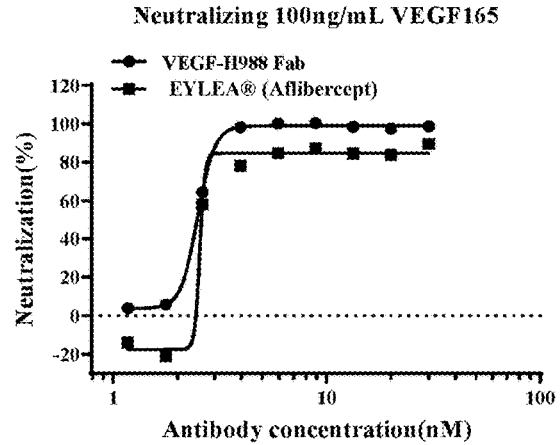
FIG. 7B shows the effect of antibody VEGF-H988 Fab and EYLEA® (Aflibercept) in neutralizing VEGF165 at a concentration of 100 ng/mL.
Figure 7C:
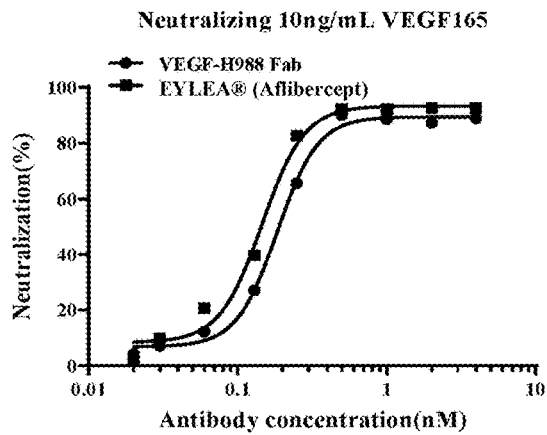
FIG. 7C shows the effect of antibody VEGF-H988 Fab and EYLEA® (Aflibercept) in neutralizing VEGF165 at a concentration of 10 ng/mL.
Figure 7D:
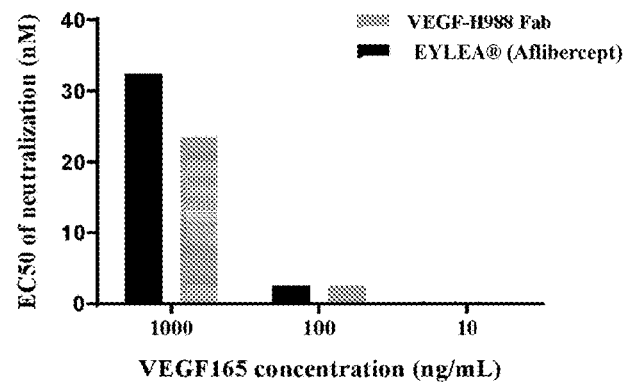
FIG. 7D shows EC50 values of neutralization calculated from the experiments from FIGS. 7A-7C.
Figure 7E:
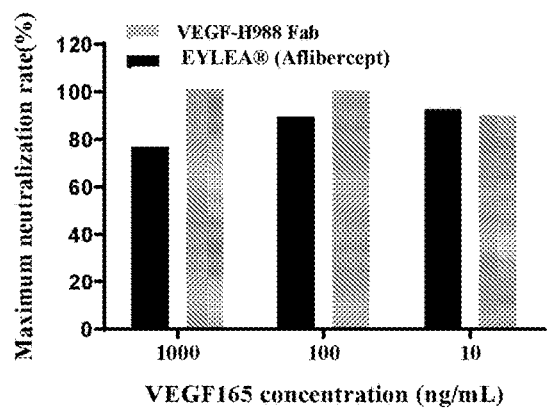
FIG. 7E shows the maximum neutralization rates from the experiments from FIGS. 7A-7C.
Figure 8A:
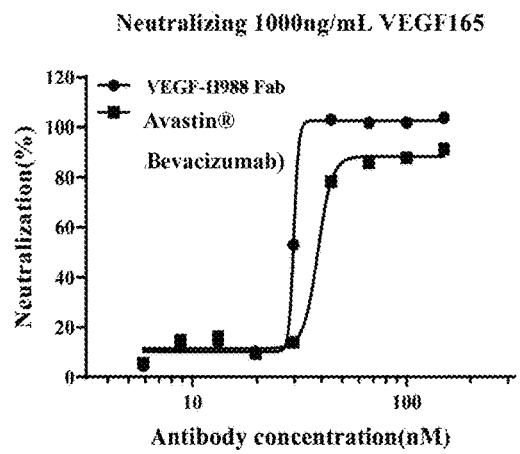
FIG. 8A shows the effect of antibody VEGF-H988 Fab and Avastin® (Bevacizumab) in neutralizing VEGF165 at a concentration of 1,000 ng/mL.
Figure 8B:
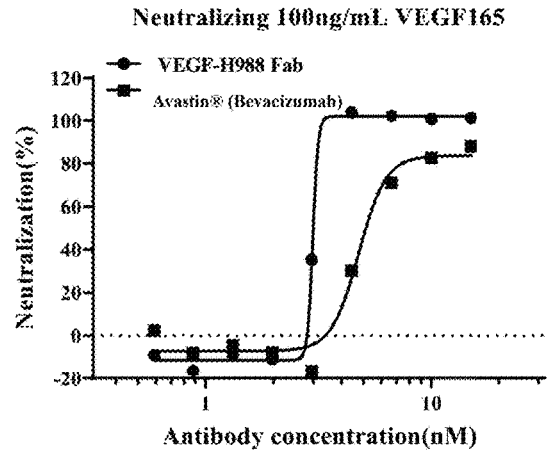
FIG. 8B shows the effect of antibody VEGF-H988 Fab and Avastin® (Bevacizumab) in neutralizing VEGF165 at a concentration of 100 ng/ml.
Figure 8C:
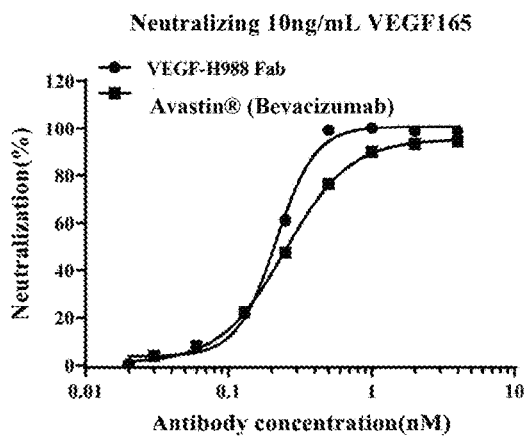
FIG. 8C shows the effect of antibody VEGF-H988 Fab and Avastin® (Bevacizumab) in neutralizing VEGF165 at a concentration of 10 ng/mL.
Figure 8D:
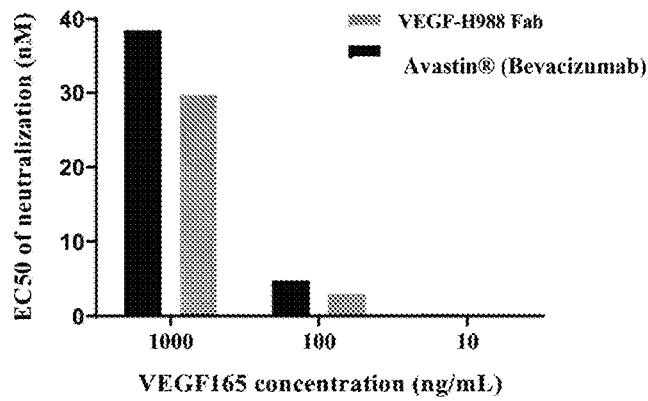
FIG. 8D shows EC50 values of neutralization calculated from the experiments from FIGS. 8A-8C.
Figure 8E:
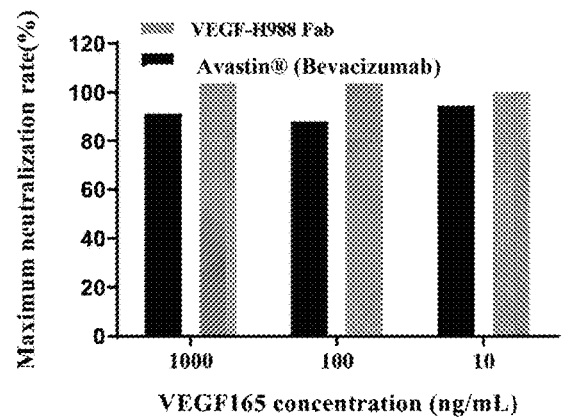
FIG. 8E shows the maximum neutralization rates from the experiments from FIGS. 8A-8C.
Figure 9A:
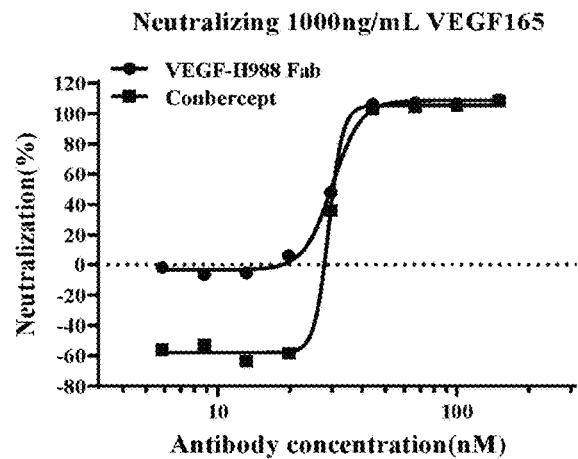
FIG. 9A shows the effect of antibody VEGF-H988 Fab and Conbercept in neutralizing VEGF165 at a concentration of 1,000 ng/mL.
Figure 9B:
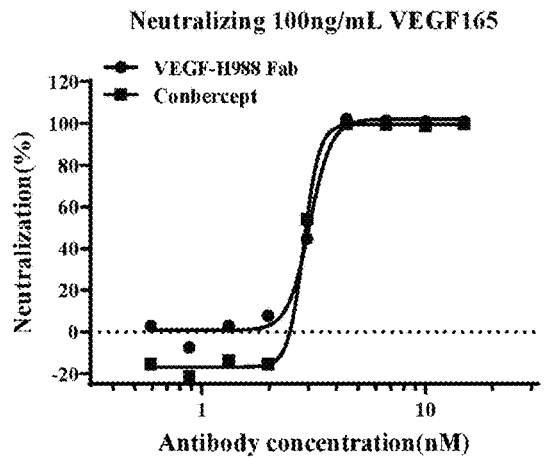
FIG. 9B shows the effect of antibody VEGF-H988 Fab and Conbercept in neutralizing VEGF165 at a concentration of 100 ng/mL.
Figure 9C:
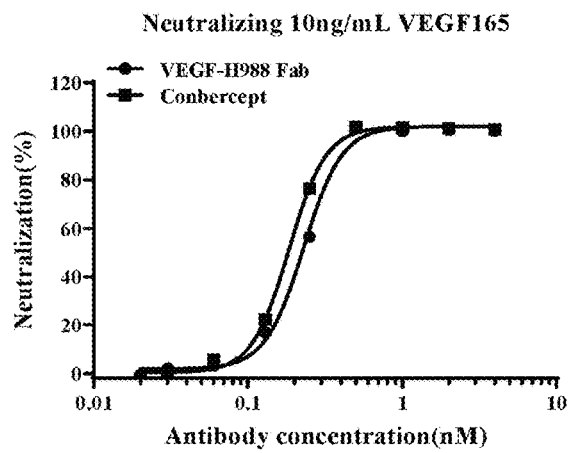
FIG. 9C shows the effect of antibody VEGF-H988 Fab and Conbercept in neutralizing VEGF165 at a concentration of 10 ng/mL.
Figure 9D:
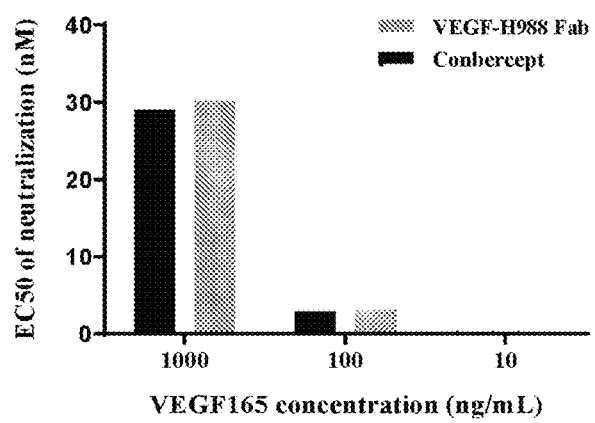
FIG. 9D shows EC50 values of neutralization calculated from the experiments from FIGS. 9A-9C.
Figure 9E:
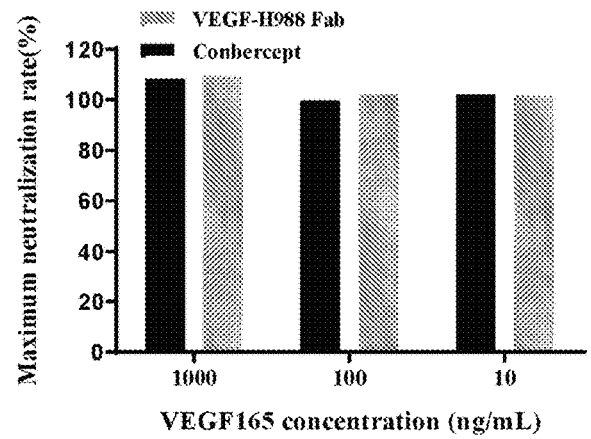
FIG. 9E shows the maximum neutralization rates from the experiments from FIGS. 9A-9C.
Figure 10A:
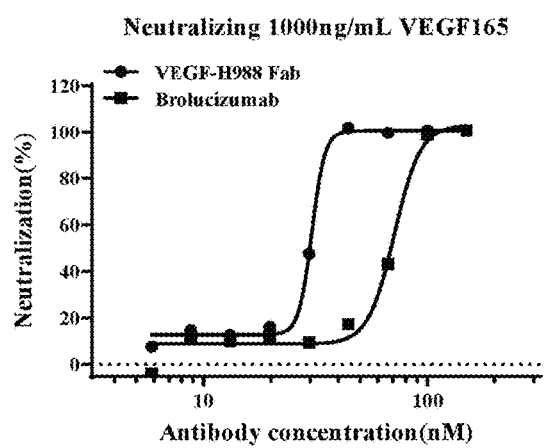
FIG. 10A shows the effect of antibody VEGF-H988 Fab and Brolucizumab in neutralizing VEGF165 at a concentration of 1,000 ng/mL.
Figure 10B:
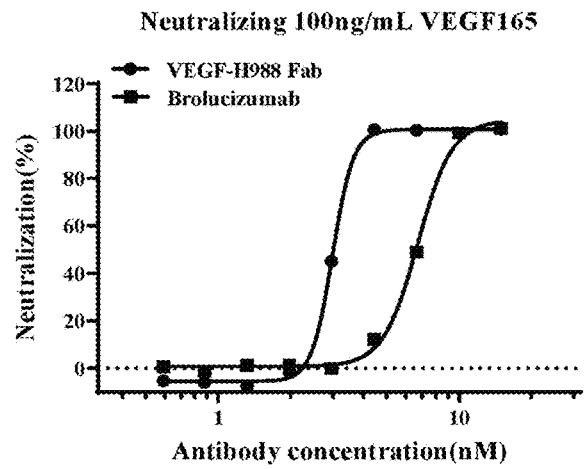
FIG. 10B shows the effect of antibody VEGF-H988 Fab and Brolucizumab in neutralizing VEGF165 at a concentration of 100 ng/mL.
Figure 10C:
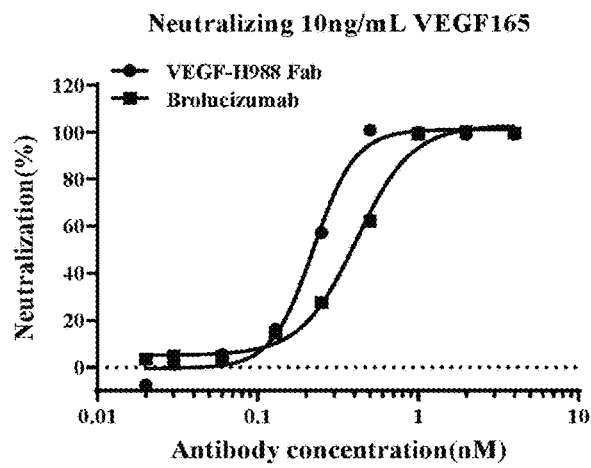
FIG. 10C shows the effect of antibody VEGF-H988 Fab and Brolucizumab in neutralizing VEGF165 at a concentration of 10 ng/mL.
Figure 10D:
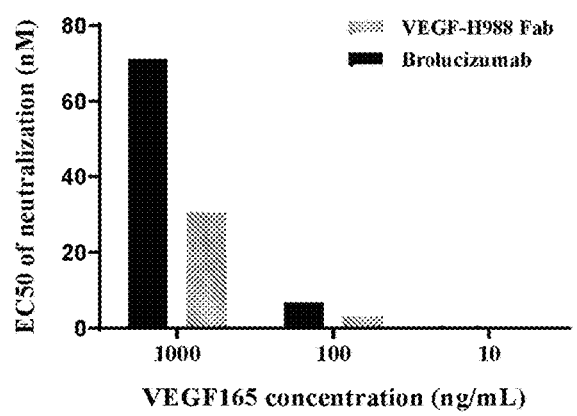
FIG. 10D shows EC50 values of neutralization calculated from the experiments from FIGS. 9A-9C.
Figure 10E:
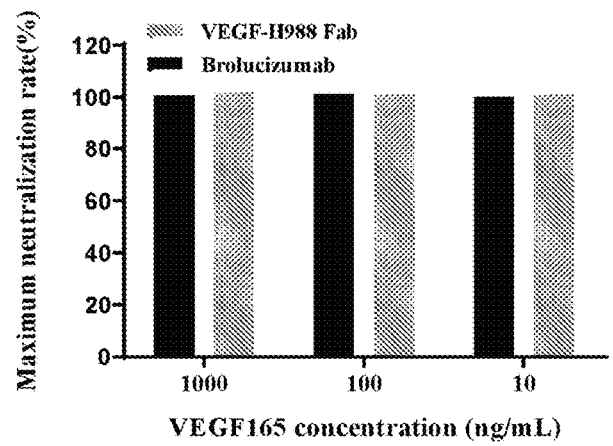
FIG. 10E shows the maximum neutralization rates from the experiments from FIGS. 9A-9C.

As shown in FIG. 5, VEGFR2 protein could effectively bind to the coated VEGF165 protein, and VEGF-H988 Fab fragments could effectively inhibit the binding of VEGFR2 protein to VEGFR165 protein, with a distinctly superior inhibitory ability than Lucentis® (Ranibizumab), and the negative control showed no inhibitory effect.

3.3 VEGF-H988 Fab Fragments Block the Growth Inhibitory Activity of VEGF165 at Different Concentrations The effect of the humanized Fab fragments neutralizing the VEGF165-induced HUVEC cells proliferation was detected by using the WST-8 method. HUVEC cells were inoculated into a 96-well plate at $4\times10^3$ cells/well, cultured in M199 medium containing 10% FBS and 5% L-Gln for 4 h, and then the humanized Fab fragments in different concentrations were added in 50 μL/well, then VEGF-165 at the final concentrations of 1000 ng/ml, 100 ng/ml or 10 ng/ml were added in 10 μL/well, the 96-well plate was incubated in a 37° C., 5% $CO_2$ cell incubator for 3 days, and the blank well B (no cells), negative control M (cells inoculated, no antibody sample added, VEGF-165 added) and M' control (cells inoculated, no antibody sample added and no VEGF-165 added) were used. After incubation, 10 μL/well of WST-8 chromogenic solution was added, and the 96-well plate was incubated in $CO_2$ incubator for color development, $OD_{450}$ and OD630 were measured with a microplate reader after the color development was stabilized the reading value was ($OD_{450}$-$OD_{630}$), and the neutralization rate of the antibody was calculated as the OD value for each group was defined as the reading value of the group minus the reading value of blank well B, the neutralization rate %=(OD value of negative control M–OD value of sample)/(OD value of negative control M–OD value of M')×100%. The standard curve was calculated using the automatic analysis function of the statistical software GraphPad Prism, taking the antibody sample concentration as the horizontal coordinate and the neutralization rate as the vertical coordinate, and the four-parameter logistic regression equation was used to fit the standard "S" curve to calculate the median effective concentration ($EC_{50}$) of the antibody sample.

As shown in FIGS. 6-10 and Table 4, the neutralizing activity of VEGF-H988 Fab was stronger, at all different concentrations of recombinant human VEGF165 proteins, than Lucentis® (Ranibizumab). When the concentrations of VEGF165 was 1000 ng/ml or 100 ng/ml, the neutralizing activity of VEGF-H988 Fab was stronger than that of EYLEA® (Aflibercept), but when the concentration of VEGF165 was 10 ng/mL, the neutralizing activity of VEGF-H988 Fab was slightly weaker than that of EYLEA® (Aflibercept). The neutralizing activity of VEGF-H988 Fab was superior, at different concentrations of recombinant human VEGF165 proteins, to those of Bevacizumab and Brolucizumab, and comparable to that of Conbercept. As the concentration of VEGF165 increased, VEGF-H988 Fab maintained a high maximum neutralization rate, while EYLEA® (Aflibercept) and Avastin® (Bevacizumab) showed decreased activities.

TABLE 4

$EC_{50}$ and maximum neutralization rate of VEGF-H988 Fab neutralizing VEGF-165

| VEGF165 concentrations neutralized | Sample | $EC_{50}$ (nM) | Maximum neutralization rate (%) |
|---|---|---|---|
| 1000 ng/ml | VEGF-H988 Fab | 19.4 | 100.4 |
| | Lucentis ® (Ranibizumab) | 43.6 | 93.9 |
| 100 ng/ml | VEGF-H988 Fab | 2.3 | 95.5 |
| | Lucentis ® (Ranibizumab) | 6.0 | 93.5 |
| 10 ng/ml | VEGF-H988 Fab | 02.3 | 96.8 |
| | Lucentis ® (Ranibizumab) | 0.31 | 96.9 |
| 1000 ng/ml | VEGF-H988 Fab | 23.45 | 101.1 |
| | EYLEA ® (Aflibercept) | 32.44 | 76.7 |
| 100 ng/ml | VEGF-H988 Fab | 2.50 | 100.4 |
| | EYLEA ® (Aflibercept) | 2.56 | 89.6 |
| 10 ng/mL | VEGF-H988 Fab | 0.18 | 90.1 |
| | EYLEA ® (Aflibercept) | 0.15 | 92.7 |
| 1000 ng/ml | VEGF-H988 Fab | 29.75 | 103.7 |
| | Bevacizumab | 38.49 | 91.3 |
| 100 ng/ml | VEGF-H988 Fab | 2.99 | 103.7 |
| | Bevacizumab | 4.77 | 88 |
| 10 ng/ml | VEGF-H988 Fab | 0.22 | 100.1 |
| | Bevacizumab | 0.25 | 94.5 |
| 1000 ng/ml | VEGF-H988 Fab | 30.08 | 109.3 |
| | Conbercept | 29.03 | 108.2 |
| 100 ng/ml | VEGF-H988 Fab | 3.04 | 102.1 |
| | Conbercept | 2.86 | 99.7 |
| 10 ng/ml | VEGF-H988 Fab | 0.23 | 101.7 |
| | Conbercept | 0.18 | 101.9 |
| 1000 ng/ml | VEGF-H988 Fab | 30.50 | 101.7 |
| | Brolucizumab | 71.18 | 100.6 |
| 100 ng/ml | VEGF-H988 Fab | 2.99 | 100.9 |
| | Brolucizumab | 6.74 | 101.3 |
| 10 ng/ml | VEGF-H988 Fab | 0.22 | 101.0 |
| | Brolucizumab | 0.41 | 100.3 |

---

SEQUENCE LISTING

<160> NUMBER OF SEQ ID NOS: 95

<210> SEQ ID NO 1
<211> LENGTH: 191
<212> TYPE: PRT
<213> ORGANISM: Artificial Sequence
<220> FEATURE:
<223> OTHER INFORMATION: Amino acid sequence of Met1- Arg191 of the
      human VEGF protein (UniProtKB P15692)

<400> SEQUENCE: 1

Met Asn Phe Leu Leu Ser Trp Val His Trp Ser Leu Ala Leu Leu Leu
1               5                   10                  15

```
Tyr Leu His His Ala Lys Trp Ser Gln Ala Ala Pro Met Ala Glu Gly
             20                  25                  30
Gly Gly Gln Asn His His Glu Val Val Lys Phe Met Asp Val Tyr Gln
         35                  40                  45
Arg Ser Tyr Cys His Pro Ile Glu Thr Leu Val Asp Ile Phe Gln Glu
     50                  55                  60
Tyr Pro Asp Glu Ile Glu Tyr Ile Phe Lys Pro Ser Cys Val Pro Leu
 65                  70                  75                  80
Met Arg Cys Gly Gly Cys Cys Asn Asp Glu Gly Leu Glu Cys Val Pro
                 85                  90                  95
Thr Glu Glu Ser Asn Ile Thr Met Gln Ile Met Arg Ile Lys Pro His
             100                 105                 110
Gln Gly Gln His Ile Gly Glu Met Ser Phe Leu Gln His Asn Lys Cys
         115                 120                 125
Glu Cys Arg Pro Lys Lys Asp Arg Ala Arg Gln Glu Lys Lys Ser Val
     130                 135                 140
Arg Gly Lys Gly Lys Gly Gln Lys Arg Lys Arg Lys Lys Ser Arg Tyr
145                 150                 155                 160
Lys Ser Trp Ser Val Tyr Val Gly Ala Arg Cys Cys Leu Met Pro Trp
                165                 170                 175
Ser Leu Pro Gly Pro His Pro Cys Gly Pro Cys Ser Glu Arg Arg
            180                 185                 190

<210> SEQ ID NO 2
<211> LENGTH: 54
<212> TYPE: DNA
<213> ORGANISM: Artificial Sequence
<220> FEATURE:
<223> OTHER INFORMATION: Nucleotide sequence of the linker used in the
      construction of the phage antibody library for the linkage of the
      rabbit antibody scFv

<400> SEQUENCE: 2
tctagtggtg gcggtggttc gggcggtggt ggaggtggta gttctagatc ttcc         54

<210> SEQ ID NO 3
<211> LENGTH: 738
<212> TYPE: DNA
<213> ORGANISM: Artificial Sequence
<220> FEATURE:
<223> OTHER INFORMATION: Nucleotide sequence of the rabbit antibody scFv
      used in the construction of antibody VEGF165-R988

<400> SEQUENCE: 3
gagctcgatc tgacccagac tccatccccc gtgtctgcgg ctgttggagg cacagtcacc    60
atcaattgcc agtccagtca gactatttat gctaacaggc gcttagcctg gtatcaacag   120
aaaccagggc agcctcccaa gctcctgatc tatggtgcat ccactctggc atctggggtc   180
ccatcgcggt tcaaaggcag tggatctggg acacagttca ctctcaccat cagcggcgtg   240
cagtgtgacg atgctgccac ttactactgt gcaggctata aaagttatga tggtgatgat   300 gttggttttcg gcgagggggac cgaggtggtc gtcaaatcta gtggtggcgg tggttcgggc   360
ggtggtggag gtggtagttc tagatcttcc cagtcggtgg aggagtccgg gggtcgcctg   420
gtaacgcctg ggacacccct gacactcacc tgcacagtct ctggaatcga cctcagtagc   480
tatgcaataa gctgggtccg ccaggctcca gggaaggggc tggaatacat cggatacatt   540
tggaatgctg gtaacaccta ctacgcgagc tgggcaaaag ccgattcac catctccaaa   600
```

```
acctcgacca cggtggatct gaaaatcacc agtccgacaa ccgaggacac ggccacctat    660
ttctgtgcca gaggaacatt aggggactac aatggcatgg accctggg  cccagggacc    720 ctcgtcaccg tctcttca                                                  738

<210> SEQ ID NO 4
<211> LENGTH: 348
<212> TYPE: DNA
<213> ORGANISM: Artificial Sequence
<220> FEATURE:
<223> OTHER INFORMATION: Nucleotide sequence of the heavy chain variable
      region of rabbit antibody VEGF165-R988

<400> SEQUENCE: 4
cagtcggtgg aggagtccgg gggtcgcctg gtaacgcctg gacacccct gacactcacc     60 tgcacagtct ctggaatcga cctcagtagc tatgcaataa gctgggtccg ccaggctcca    120
gggaaggggc tggaatacat cggatacatt tggaatgctg gtaacaccta ctacgcgagc   180
tgggcaaaag gccgattcac catctccaaa acctcgacca cggtggatct gaaaatcacc   240
agtccgacaa ccgaggacac ggccacctat ttctgtgcca gaggaacatt aggggactac   300
aatggcatgg accctgggg cccagggacc ctcgtcaccg tctcttca                 348

<210> SEQ ID NO 5
<211> LENGTH: 336
<212> TYPE: DNA
<213> ORGANISM: Artificial Sequence
<220> FEATURE:
<223> OTHER INFORMATION: Nucleotide sequence of the light chain variable
      region of rabbit antibody VEGF165-R988

<400> SEQUENCE: 5
gagctcgatc tgacccagac tccatccccc gtgtctgcgg ctgttggagg cacagtcacc    60
atcaattgcc agtccagtca gactatttat gctaacaggc gcttagcctg gtatcaacag   120
aaaccagggc agcctcccaa gctcctgatc tatggtgcat ccactctggc atctggggtc   180
ccatcgcggt tcaaaggcag tggatctggg acacagttca ctctcaccat cagcggcgtg   240
cagtgtgacg atgctgccac ttactactgt gcaggctata aaagttatga tggtgatgat   300
gttggtttcg gcggagggac cgaggtggtc gtcaaa                             336

<210> SEQ ID NO 6
<211> LENGTH: 972
<212> TYPE: DNA
<213> ORGANISM: Artificial Sequence
<220> FEATURE:
<223> OTHER INFORMATION: Nucleotide sequence of the heavy chain constant
      region of rabbit IgG1

<400> SEQUENCE: 6
ggtcaaccta aggctccgtc agtcttccca ctggccccct gctgcgggga cacacccagc    60
tccacggtga ccctgggctg cctggtcaaa ggctacctcc cggagccagt gaccgtgacc   120
tggaactcgg gcaccctcac caatggggta cgcaccttcc cgtccgtccg gcagtcctca   180
ggcctctact cgctgagcag cgtggtgagc gtgacctcaa gcagccagcc cgtcacctgc   240
aacgtggccc acccagccac caacaccaaa gtggacaaga ccgttgcgcc ctcgacatgc   300
agcaagccca gtgcccaccc cctgaactc ctgggggac cgtctgtctt catcttcccc    360
ccaaaaccca aggacaccct catgatctca cgcaccccg aggtcacatg cgtggtggtg    420
gacgtgagcc aggatgaccc cgaggtgcag ttcacatggt acataaacaa cgagcaggtg   480
```

```
cgcaccgccc ggccgccgct acgggagcag cagttcaaca gcacgatccg cgtggtcagc      540
accctcccca tcgcgcacca ggactggctg aggggcaagg agttcaagtg caaagtccac      600
aacaaggcac tcccggcccc catcgagaaa accatctcca agccagagg gcagcccctg       660 gagccgaagg tctacaccat gggcccctcc cgggaggagc tgagcagcag gtcggtcagc      720
ctgacctgca tgatcaacgg cttctaccct tccgacatct cggtggagtg ggagaagaac      780
gggaaggcag aggacaacta caagaccacg ccggccgtgc tggacagcga cggctcctac      840
ttcctctaca gcaagctctc agtgcccacg agtgagtggc agcggggcga cgtcttcacc      900
tgctccgtga tgcacgaggc cttgcacaac cactacacgc agaagtccat ctcccgctct      960
ccgggtaaat aa                                                          972
```

<210> SEQ ID NO 7
<211> LENGTH: 315
<212> TYPE: DNA
<213> ORGANISM: Artificial Sequence
<220> FEATURE:
<223> OTHER INFORMATION: Nucleotide sequence of the constant region of
      rabbit kappa light chain

<400> SEQUENCE: 7

```
ggggatccag ttgcacctac tgtcctcatc ttcccaccag ctgctgatca ggtggcaact      60
ggaacagtca ccatcgtgtg tgtggcgaat aaatactttc ccgatgtcac cgtcacctgg     120
gaggtggatg gcaccaccca aacaactggc atcgagaaca gtaaacaccg cagaattct      180 gcagattgta cctacaacct cagcagcact ctgacactga ccagcacaca gtacaacagc     240
cacaaagagt acacctgcaa ggtgacccag ggcacgacct cagtcgtcca gagcttcaat    300
aggggtgact gttaa                                                      315
```

<210> SEQ ID NO 8
<211> LENGTH: 116
<212> TYPE: PRT
<213> ORGANISM: Artificial Sequence
<220> FEATURE:
<223> OTHER INFORMATION: Amino acid sequence of the heavy chain variable
      region of rabbit antibody VEGF165-R988

<400> SEQUENCE: 8

```
Gln Ser Val Glu Glu Ser Gly Gly Arg Leu Val Thr Pro Gly Thr Pro
1               5                   10                  15

Leu Thr Leu Thr Cys Thr Val Ser Gly Ile Asp Leu Ser Ser Tyr Ala
            20                  25                  30

Ile Ser Trp Val Arg Gln Ala Pro Gly Lys Gly Leu Glu Tyr Ile Gly
        35                  40                  45

Tyr Ile Trp Asn Ala Gly Asn Thr Tyr Tyr Ala Ser Trp Ala Lys Gly
    50                  55                  60

Arg Phe Thr Ile Ser Lys Thr Ser Thr Thr Val Asp Leu Lys Ile Thr
65                  70                  75                  80

Ser Pro Thr Thr Glu Asp Thr Ala Thr Tyr Phe Cys Ala Arg Gly Thr
                85                  90                  95

Leu Gly Asp Tyr Asn Gly Met Asp Pro Trp Gly Pro Gly Thr Leu Val
            100                 105                 110

Thr Val Ser Ser
        115
```

<210> SEQ ID NO 9
<211> LENGTH: 112

```
<212> TYPE: PRT
<213> ORGANISM: Artificial Sequence
<220> FEATURE:
<223> OTHER INFORMATION: Amino acid sequence of the light chain variable
      region of rabbit antibody VEGF165-R988

<400> SEQUENCE: 9

Glu Leu Asp Leu Thr Gln Thr Pro Ser Pro Val Ser Ala Ala Val Gly
1               5                   10                  15

Gly Thr Val Thr Ile Asn Cys Gln Ser Ser Gln Thr Ile Tyr Ala Asn
            20                  25                  30

Arg Arg Leu Ala Trp Tyr Gln Gln Lys Pro Gly Gln Pro Pro Lys Leu
        35                  40                  45

Leu Ile Tyr Gly Ala Ser Thr Leu Ala Ser Gly Val Pro Ser Arg Phe
    50                  55                  60

Lys Gly Ser Gly Ser Gly Thr Gln Phe Thr Leu Thr Ile Ser Gly Val
65                  70                  75                  80

Gln Cys Asp Asp Ala Ala Thr Tyr Tyr Cys Ala Gly Tyr Lys Ser Tyr
                85                  90                  95

Asp Gly Asp Asp Val Gly Phe Gly Gly Gly Thr Glu Val Val Val Lys
            100                 105                 110

<210> SEQ ID NO 10
<211> LENGTH: 13
<212> TYPE: PRT
<213> ORGANISM: Artificial Sequence
<220> FEATURE:
<223> OTHER INFORMATION: Amino acid sequence of the light chain CDR1 of
      rabbit antibody VEGF165-R988

<400> SEQUENCE: 10

Gln Ser Ser Gln Thr Ile Tyr Ala Asn Arg Arg Leu Ala
1               5                   10

<210> SEQ ID NO 11
<211> LENGTH: 7
<212> TYPE: PRT
<213> ORGANISM: Artificial Sequence
<220> FEATURE:
<223> OTHER INFORMATION: Amino acid sequence of the light chain CDR2 of
      rabbit antibody VEGF165-R988

<400> SEQUENCE: 11

Gly Ala Ser Thr Leu Ala Ser
1               5

<210> SEQ ID NO 12
<211> LENGTH: 12
<212> TYPE: PRT
<213> ORGANISM: Artificial Sequence
<220> FEATURE:
<223> OTHER INFORMATION: Amino acid sequence of the light chain CDR3 of
      rabbit antibody VEGF165-R988

<400> SEQUENCE: 12

Ala Gly Tyr Lys Ser Tyr Asp Gly Asp Asp Val Gly
1               5                   10

<210> SEQ ID NO 13
<211> LENGTH: 10
<212> TYPE: PRT
<213> ORGANISM: Artificial Sequence
<220> FEATURE:
<223> OTHER INFORMATION: Amino acid sequence of the heavy chain CDR1 of
      rabbit antibody VEGF165-R988
```

<400> SEQUENCE: 13

Gly Ile Asp Leu Ser Ser Tyr Ala Ile Ser
1               5                   10

<210> SEQ ID NO 14
<211> LENGTH: 16
<212> TYPE: PRT
<213> ORGANISM: Artificial Sequence
<220> FEATURE:
<223> OTHER INFORMATION: Amino acid sequence of the heavy chain CDR2 of
      rabbit antibody VEGF165-R988

<400> SEQUENCE: 14

Tyr Ile Trp Asn Ala Gly Asn Thr Tyr Tyr Ala Ser Trp Ala Lys Gly
1               5                   10                  15

<210> SEQ ID NO 15
<211> LENGTH: 13
<212> TYPE: PRT
<213> ORGANISM: Artificial Sequence
<220> FEATURE:
<223> OTHER INFORMATION: Amino acid sequence of the heavy chain CDR3 of
      rabbit antibody VEGF165-R988

<400> SEQUENCE: 15

Ala Arg Gly Thr Leu Gly Asp Tyr Asn Gly Met Asp Pro
1               5                   10

<210> SEQ ID NO 16
<211> LENGTH: 1404
<212> TYPE: DNA
<213> ORGANISM: Artificial Sequence
<220> FEATURE:
<223> OTHER INFORMATION: Nucleotide sequence of the humanized antibody
      VEGF165-H988-10 heavy chain containing signal peptide

<400> SEQUENCE: 16

| | | | | | |
|---|---|---|---|---|---|
| atgggctggt | ccctgattct | gctgttcctg | gtggctgtgg | ctaccagggt | gctgagtcag | 60 |
| tctgtccagg | agtctggacc | tggactggtg | aagccatctg | agaccctgtc | cctgacttgt | 120 |
| actgtgtctg | gcattgacct | gtcctcctat | gccatctcct | gggtgagaca | acctcctggc | 180 |
| aagggattgg | aatacattgg | ctacatctgg | aatgctggca | acacctacta | tgcctcctgg | 240 |
| gctaagggca | gggtgaccat | ctctgtggac | accagcaaga | accaggtgga | cctgaaactg | 300 |
| tcctctgtga | cagcagcaga | cacagcagtc | tacttctgtg | ccaggggcac | cctgggagac | 360 |
| tacaatggga | tggaccccatg | gggacctggc | accctggtga | cagtgtccag | cgctagcacc | 420 |
| aagggcccat | cggtcttccc | cctggcaccc | tcctccaaga | gcacctctgg | gggcacagcg | 480 |
| gccctgggct | gcctggtcaa | ggactacttc | cccgaaccgg | tgacggtgtc | gtggaactca | 540 |
| ggcgccctga | ccagcggcgt | gcacaccttc | ccggctgtcc | tacagtcctc | aggactctac | 600 |
| tccctcagca | gcgtggtgac | cgtgccctcc | agcagcttgg | gcacccagac | ctacatctgc | 660 |
| aacgtgaatc | acaagcccag | caacaccaag | gtggacaaga | aagttgagcc | caaatcttgt | 720 |
| gacaaaactc | acacatgccc | accgtgccca | gcacctgaac | tcctgggggg | accgtcagtc | 780 |
| ttcctcttcc | ccccaaaacc | caaggacacc | ctcatgatct | cccggacccc | tgaggtcacg | 840 |
| tgcgtggtgg | tggacgtgag | ccacgaagac | cccgaggtca | agttcaactg | gtacgtggac | 900 |
| ggcgtggagg | tgcataatgc | caagacaaag | ccgcgggagg | agcagtacaa | cagcacgtac | 960 |
| cgtgtggtca | gcgtcctcac | cgtcctgcac | caggactggc | tgaatggcaa | ggagtacaag | 1020 |

```
tgcaaggtct ccaacaaagc cctcccagcc cccatcgaga aaaccatctc caaagccaaa    1080
gggcagcccc gagaaccaca ggtgtacacc ctgcccccat cccgggatga gctgaccaag    1140
aaccaggtca gcctgacctg cctggtcaaa ggcttctatc ccagcgacat cgccgtggag    1200
tgggagagca tgggcagcc ggagaacaac tacaagacca cgcctcccgt gctggactcc    1260
gacggctcct tcttcctcta cagcaagctc accgtggaca gagcaggtg gcagcagggg    1320 aacgtcttct catgctccgt gatgcatgag gctctgcaca accactacac gcagaagagc    1380
ctctccctgt ctccgggtaa atga                                           1404
```

<210> SEQ ID NO 17
<211> LENGTH: 717
<212> TYPE: DNA
<213> ORGANISM: Artificial Sequence
<220> FEATURE:
<223> OTHER INFORMATION: Nucleotide sequence of the humanized antibody
      VEGF165-H988-10 light chain containing signal peptide

<400> SEQUENCE: 17

```
atgggctggt cctgtatcat cctgttcctg gtggctacag ccacaggagt gcatagtgaa     60
ctccaactta cccagagccc atcctccctg tctgcctctg tgggagacag ggtgaccatc    120
acttgtcagt ccagccagac catctatgcc aacaggagac tggcttggta tcaacagaag    180
cctggcaagg tgccaaaact gctgatttat ggagccagca ccctggcatc tggagtgcca    240
agcaggttca agggctctgg ctctggcaca gacttcaccc tgaccatctc ctccctccaa    300
cctgaggatg tggctaccta ctactgtgct ggctacaagt cctatgatgg agatgatgtg    360
ggctttggag gaggcaccaa ggtggagatt aagcgtacgg tggctgcacc atctgtcttc    420
atcttcccgc catctgatga gcagttgaaa tctggaactg cctctgttgt gtgcctgctg    480
aataacttct atcccagaga ggccaaagta cagtggaagg tggataacgc cctccaatcg    540
ggtaactccc aggagagtgt cacagagcag gacagcaagg acagcaccta cagcctcagc    600
agcaccctga cgctgagcaa agcagactac gagaaacaca aagtctacgc ctgcgaagtc    660
acccatcagg gcctgagctc gcccgtcaca aagagcttca acaggggaga gtgttag      717
```

<210> SEQ ID NO 18
<211> LENGTH: 467
<212> TYPE: PRT
<213> ORGANISM: Artificial Sequence
<220> FEATURE:
<223> OTHER INFORMATION: Amino acid sequence of the heavy chain of
      humanized antibody VEGF165-H988-10 containing signal peptide

<400> SEQUENCE: 18

```
Met Gly Trp Ser Leu Ile Leu Leu Phe Leu Val Ala Val Ala Thr Arg
1               5                   10                  15

Val Leu Ser Gln Ser Val Gln Glu Ser Gly Pro Gly Leu Val Lys Pro
            20                  25                  30

Ser Glu Thr Leu Ser Leu Thr Cys Thr Val Ser Gly Ile Asp Leu Ser
        35                  40                  45

Ser Tyr Ala Ile Ser Trp Val Arg Gln Pro Pro Gly Lys Gly Leu Glu
    50                  55                  60

Tyr Ile Gly Tyr Ile Trp Asn Ala Gly Asn Tyr Tyr Ala Ser Trp
65                  70                  75                  80

Ala Lys Gly Arg Val Thr Ile Ser Val Asp Thr Ser Lys Asn Gln Val
                85                  90                  95

Asp Leu Lys Leu Ser Ser Val Thr Ala Ala Asp Thr Ala Val Tyr Phe
```

```
                100             105             110
Cys Ala Arg Gly Thr Leu Gly Asp Tyr Asn Gly Met Asp Pro Trp Gly
            115             120             125
Pro Gly Thr Leu Val Thr Val Ser Ala Ser Thr Lys Gly Pro Ser
        130             135             140
Val Phe Pro Leu Ala Pro Ser Ser Lys Ser Thr Ser Gly Gly Thr Ala
145             150             155             160
Ala Leu Gly Cys Leu Val Lys Asp Tyr Phe Pro Glu Pro Val Thr Val
            165             170             175
Ser Trp Asn Ser Gly Ala Leu Thr Ser Gly Val His Thr Phe Pro Ala
            180             185             190
Val Leu Gln Ser Ser Gly Leu Tyr Ser Leu Ser Ser Val Val Thr Val
            195             200             205
Pro Ser Ser Ser Leu Gly Thr Gln Thr Tyr Ile Cys Asn Val Asn His
            210             215             220
Lys Pro Ser Asn Thr Lys Val Asp Lys Lys Val Glu Pro Lys Ser Cys
225             230             235             240
Asp Lys Thr His Thr Cys Pro Pro Cys Pro Ala Pro Glu Leu Leu Gly
            245             250             255
Gly Pro Ser Val Phe Leu Phe Pro Pro Lys Pro Lys Asp Thr Leu Met
            260             265             270
Ile Ser Arg Thr Pro Glu Val Thr Cys Val Val Val Asp Val Ser His
            275             280             285
Glu Asp Pro Glu Val Lys Phe Asn Trp Tyr Val Asp Gly Val Glu Val
            290             295             300
His Asn Ala Lys Thr Lys Pro Arg Glu Glu Gln Tyr Asn Ser Thr Tyr
305             310             315             320
Arg Val Val Ser Val Leu Thr Val Leu His Gln Asp Trp Leu Asn Gly
            325             330             335
Lys Glu Tyr Lys Cys Lys Val Ser Asn Lys Ala Leu Pro Ala Pro Ile
            340             345             350
Glu Lys Thr Ile Ser Lys Ala Lys Gly Gln Pro Arg Glu Pro Gln Val
            355             360             365
Tyr Thr Leu Pro Pro Ser Arg Asp Glu Leu Thr Lys Asn Gln Val Ser
            370             375             380
Leu Thr Cys Leu Val Lys Gly Phe Tyr Pro Ser Asp Ile Ala Val Glu
385             390             395             400
Trp Glu Ser Asn Gly Gln Pro Glu Asn Asn Tyr Lys Thr Thr Pro Pro
            405             410             415
Val Leu Asp Ser Asp Gly Ser Phe Phe Leu Tyr Ser Lys Leu Thr Val
            420             425             430
Asp Lys Ser Arg Trp Gln Gln Gly Asn Val Phe Ser Cys Ser Val Met
            435             440             445
His Glu Ala Leu His Asn His Tyr Thr Gln Lys Ser Leu Ser Leu Ser
            450             455             460
Pro Gly Lys
465

<210> SEQ ID NO 19
<211> LENGTH: 238
<212> TYPE: PRT
<213> ORGANISM: Artificial Sequence
<220> FEATURE:
<223> OTHER INFORMATION: Amino acid sequence of the light chain of
      humanized antibody VEGF165-H988-10 containing signal peptide
```

<400> SEQUENCE: 19

```
Met Gly Trp Ser Cys Ile Ile Leu Phe Leu Val Ala Thr Ala Thr Gly
 1               5                  10                  15
Val His Ser Glu Leu Gln Leu Thr Gln Ser Pro Ser Ser Leu Ser Ala
             20                  25                  30
Ser Val Gly Asp Arg Val Thr Ile Thr Cys Gln Ser Ser Gln Thr Ile
         35                  40                  45
Tyr Ala Asn Arg Arg Leu Ala Trp Tyr Gln Gln Lys Pro Gly Lys Val
     50                  55                  60
Pro Lys Leu Leu Ile Tyr Gly Ala Ser Thr Leu Ala Ser Gly Val Pro
 65                  70                  75                  80
Ser Arg Phe Lys Gly Ser Gly Ser Gly Thr Asp Phe Thr Leu Thr Ile
                 85                  90                  95
Ser Ser Leu Gln Pro Glu Asp Val Ala Thr Tyr Tyr Cys Ala Gly Tyr
            100                 105                 110
Lys Ser Tyr Asp Gly Asp Val Gly Phe Gly Gly Thr Lys Val
        115                 120                 125
Glu Ile Lys Arg Thr Val Ala Ala Pro Ser Val Phe Ile Phe Pro Pro
    130                 135                 140
Ser Asp Glu Gln Leu Lys Ser Gly Thr Ala Ser Val Val Cys Leu Leu
145                 150                 155                 160
Asn Asn Phe Tyr Pro Arg Glu Ala Lys Val Gln Trp Lys Val Asp Asn
                165                 170                 175
Ala Leu Gln Ser Gly Asn Ser Gln Glu Ser Val Thr Glu Gln Asp Ser
            180                 185                 190
Lys Asp Ser Thr Tyr Ser Leu Ser Ser Thr Leu Thr Leu Ser Lys Ala
        195                 200                 205
Asp Tyr Glu Lys His Lys Val Tyr Ala Cys Glu Val Thr His Gln Gly
    210                 215                 220
Leu Ser Ser Pro Val Thr Lys Ser Phe Asn Arg Gly Glu Cys
225                 230                 235
```

<210> SEQ ID NO 20
<211> LENGTH: 354
<212> TYPE: DNA
<213> ORGANISM: Artificial Sequence
<220> FEATURE:
<223> OTHER INFORMATION: Nucleotide sequence of the heavy chain variable region of humanized antibody VEGF165-H988-10

<400> SEQUENCE: 20

```
cagtctgtcc aggagtctgg acctggactg gtgaagccat ctgagaccct gtccctgact      60
tgtactgtgt ctggcattga cctgtcctcc tatgccatct cctgggtgag acaacctcct     120
ggcaagggat tggaatacat tggctacatc tggaatgctg caacaccta ctatgcctcc      180
tgggctaagg gcagggtgac catctctgtg gacaccagca agaaccaggt ggacctgaaa     240
ctgtcctctg tgacagcagc agacacagca gtctacttct gtgccagggg caccctggga     300
gactacaatg ggatggaccc atggggacct ggcaccctgg tgacagtgtc cagc           354
```

<210> SEQ ID NO 21
<211> LENGTH: 336
<212> TYPE: DNA
<213> ORGANISM: Artificial Sequence
<220> FEATURE:
<223> OTHER INFORMATION: Nucleotide sequence of the light chain variable region of humanized antibody VEGF165-H988-10

<400> SEQUENCE: 21

```
gaactccaac ttacccagag cccatcctcc ctgtctgcct ctgtgggaga cagggtgacc    60
atcacttgtc agtccagcca gaccatctat gccaacagga gactggcttg gtatcaacag   120
aagcctggca aggtgccaaa actgctgatt tatggagcca gcaccctggc atctggagtg   180
ccaagcaggt tcaagggctc tggctctggc acagacttca ccctgaccat ctcctccctc   240
caacctgagg atgtggctac ctactactgt gctggctaca gtcctatga tggagatgat   300 gtgggctttg gaggaggcac caaggtggag attaag                              336
```

<210> SEQ ID NO 22
<211> LENGTH: 118
<212> TYPE: PRT
<213> ORGANISM: Artificial Sequence
<220> FEATURE:
<223> OTHER INFORMATION: Amino acid sequence of the heavy chain variable
    region of antibody VEGF165-H988-10

<400> SEQUENCE: 22

```
Gln Ser Val Gln Glu Ser Gly Pro Gly Leu Val Lys Pro Ser Glu Thr
1               5                  10                  15

Leu Ser Leu Thr Cys Thr Val Ser Gly Ile Asp Leu Ser Ser Tyr Ala
            20                  25                  30

Ile Ser Trp Val Arg Gln Pro Pro Gly Lys Gly Leu Glu Tyr Ile Gly
        35                  40                  45

Tyr Ile Trp Asn Ala Gly Asn Thr Tyr Tyr Ala Ser Trp Ala Lys Gly
    50                  55                  60

Arg Val Thr Ile Ser Val Asp Thr Ser Lys Asn Gln Val Asp Leu Lys
65                  70                  75                  80

Leu Ser Ser Val Thr Ala Ala Asp Thr Ala Val Tyr Phe Cys Ala Arg
                85                  90                  95

Gly Thr Leu Gly Asp Tyr Asn Gly Met Asp Pro Trp Gly Pro Gly Thr
            100                 105                 110

Leu Val Thr Val Ser Ser
        115
```

<210> SEQ ID NO 23
<211> LENGTH: 112
<212> TYPE: PRT
<213> ORGANISM: Artificial Sequence
<220> FEATURE:
<223> OTHER INFORMATION: Amino acid sequence of the light chain variable
    region of antibody VEGF165-H988-10

<400> SEQUENCE: 23

```
Glu Leu Gln Leu Thr Gln Ser Pro Ser Ser Leu Ser Ala Ser Val Gly
1               5                  10                  15

Asp Arg Val Thr Ile Thr Cys Gln Ser Ser Gln Thr Ile Tyr Ala Asn
            20                  25                  30

Arg Arg Leu Ala Trp Tyr Gln Gln Lys Pro Gly Lys Val Pro Lys Leu
        35                  40                  45

Leu Ile Tyr Gly Ala Ser Thr Leu Ala Ser Gly Val Pro Ser Arg Phe
    50                  55                  60

Lys Gly Ser Gly Ser Gly Thr Asp Phe Thr Leu Thr Ile Ser Ser Leu
65                  70                  75                  80

Gln Pro Glu Asp Val Ala Thr Tyr Tyr Cys Ala Gly Tyr Lys Ser Tyr
                85                  90                  95
```

Asp Gly Asp Val Gly Phe Gly Gly Gly Thr Lys Val Glu Ile Lys
            100                 105                 110

<210> SEQ ID NO 24
<211> LENGTH: 13
<212> TYPE: PRT
<213> ORGANISM: Artificial Sequence
<220> FEATURE:
<223> OTHER INFORMATION: Amino acid sequence of the light chain CDR1 of
      humanized antibody VEGF-H988 Fab fragment

<400> SEQUENCE: 24

Gln Ser Ser Lys Phe Leu Trp Gln Gly Arg Arg Leu Ala
1               5                   10

<210> SEQ ID NO 25
<211> LENGTH: 7
<212> TYPE: PRT
<213> ORGANISM: Artificial Sequence
<220> FEATURE:
<223> OTHER INFORMATION: Amino acid sequence of the light chain CDR2 of
      humanized antibody VEGF-H988 Fab fragment

<400> SEQUENCE: 25

Gly Ala Ser Thr Leu Ala Ser
1               5

<210> SEQ ID NO 26
<211> LENGTH: 12
<212> TYPE: PRT
<213> ORGANISM: Artificial Sequence
<220> FEATURE:
<223> OTHER INFORMATION: Amino acid sequence of the light chain CDR3 of
      humanized antibody VEGF-H988 Fab fragment

<400> SEQUENCE: 26

Ala Gly Tyr Lys Ser Tyr Asp Gly Asp Val Val Gly
1               5                   10

<210> SEQ ID NO 27
<211> LENGTH: 10
<212> TYPE: PRT
<213> ORGANISM: Artificial Sequence
<220> FEATURE:
<223> OTHER INFORMATION: Amino acid sequence of the heavy chain CDR1 of
      humanized antibody VEGF-H988 Fab fragment

<400> SEQUENCE: 27

Gly Ile Asp Leu Ser Ser Tyr Ala Ile Ser
1               5                   10

<210> SEQ ID NO 28
<211> LENGTH: 16
<212> TYPE: PRT
<213> ORGANISM: Artificial Sequence
<220> FEATURE:
<223> OTHER INFORMATION: Amino acid sequence of the heavy chain CDR2 of
      humanized antibody VEGF-H988 Fab fragment

<400> SEQUENCE: 28

Tyr Ile Trp Asn Asp Leu Phe Thr Tyr Tyr Ala Ser Trp Ala Lys Gly
1               5                   10                  15

<210> SEQ ID NO 29
<211> LENGTH: 13
<212> TYPE: PRT
<213> ORGANISM: Artificial Sequence
<220> FEATURE:

<223> OTHER INFORMATION: Amino acid sequence of the heavy chain CDR3 of
      humanized antibody VEGF-H988 Fab fragment

<400> SEQUENCE: 29

Ala Arg Gly Thr Leu Gly Asp Tyr Gly Gly Met Asp Pro
1               5                   10

<210> SEQ ID NO 30
<211> LENGTH: 221
<212> TYPE: PRT
<213> ORGANISM: Artificial Sequence
<220> FEATURE:
<223> OTHER INFORMATION: Amino acid sequence of the heavy chain of
      humanized antibody VEGF-H988 Fab fragment

<400> SEQUENCE: 30

Gln Ser Val Gln Glu Ser Gly Pro Gly Leu Val Lys Pro Ser Glu Thr
1               5                   10                  15

Leu Ser Leu Thr Cys Thr Val Ser Gly Ile Asp Leu Ser Ser Tyr Ala
                20                  25                  30

Ile Ser Trp Val Arg Gln Pro Pro Gly Lys Gly Leu Glu Tyr Ile Gly
            35                  40                  45

Tyr Ile Trp Asn Asp Leu Phe Thr Tyr Tyr Ala Ser Trp Ala Lys Gly
        50                  55                  60

Arg Val Thr Ile Ser Val Asp Thr Ser Lys Asn Gln Val Asp Leu Lys
65                  70                  75                  80

Leu Ser Ser Val Thr Ala Ala Asp Thr Ala Val Tyr Phe Cys Ala Arg
                85                  90                  95

Gly Thr Leu Gly Asp Tyr Gly Gly Met Asp Pro Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Cys
    210                 215                 220

<210> SEQ ID NO 31
<211> LENGTH: 219
<212> TYPE: PRT
<213> ORGANISM: Artificial Sequence
<220> FEATURE:
<223> OTHER INFORMATION: Amino acid sequence of the light chain of
      humanized antibody VEGF-H988 Fab fragment

<400> SEQUENCE: 31

Glu Leu Gln Leu Thr Gln Ser Pro Ser Ser Leu Ser Ala Ser Val Gly
1               5                   10                  15

Asp Arg Val Thr Ile Thr Cys Gln Ser Ser Lys Phe Leu Trp Gln Gly
                20                  25                  30

Arg Arg Leu Ala Trp Tyr Gln Gln Lys Pro Gly Lys Val Pro Lys Leu

```
                35                  40                  45
Leu Ile Tyr Gly Ala Ser Thr Leu Ala Ser Gly Val Pro Ser Arg Phe
 50                  55                  60

Lys Gly Ser Gly Ser Gly Thr Asp Phe Thr Leu Thr Ile Ser Ser Leu
 65                  70                  75                  80

Gln Pro Glu Asp Val Ala Thr Tyr Tyr Cys Ala Gly Tyr Lys Ser Tyr
                 85                  90                  95

Asp Gly Asp Val Val Gly Phe Gly Gly Gly Thr Lys Val Glu Ile Lys
                100                 105                 110

Arg Thr Val Ala Ala Pro Ser Val Phe Ile Phe Pro Pro Ser Asp Glu
                115                 120                 125

Gln Leu Lys Ser Gly Thr Ala Ser Val Val Cys Leu Leu Asn Asn Phe
130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
                180                 185                 190

Lys His Lys Val Tyr Ala Cys Glu Val Thr His Gln Gly Leu Ser Ser
                195                 200                 205

Pro Val Thr Lys Ser Phe Asn Arg Gly Glu Cys
                210                 215

<210> SEQ ID NO 32
<211> LENGTH: 240
<212> TYPE: PRT
<213> ORGANISM: Artificial Sequence
<220> FEATURE:
<223> OTHER INFORMATION: Amino acid sequence of the heavy chain of
      humanized antibody VEGF-H988 Fab fragment containing signal
      peptide

<400> SEQUENCE: 32

Met Gly Trp Ser Leu Ile Leu Leu Phe Leu Val Ala Val Ala Thr Arg
 1               5                  10                  15

Val Leu Ser Gln Ser Val Gln Glu Ser Gly Pro Gly Leu Val Lys Pro
                 20                  25                  30

Ser Glu Thr Leu Ser Leu Thr Cys Thr Val Ser Gly Ile Asp Leu Ser
                 35                  40                  45

Ser Tyr Ala Ile Ser Trp Val Arg Gln Pro Pro Gly Lys Gly Leu Glu
 50                  55                  60

Tyr Ile Gly Tyr Ile Trp Asn Asp Leu Phe Thr Tyr Tyr Ala Ser Trp
 65                  70                  75                  80

Ala Lys Gly Arg Val Thr Ile Ser Val Asp Thr Ser Lys Asn Gln Val
                 85                  90                  95

Asp Leu Lys Leu Ser Ser Val Thr Ala Ala Asp Thr Ala Val Tyr Phe
                100                 105                 110

Cys Ala Arg Gly Thr Leu Gly Asp Tyr Gly Gly Met Asp Pro Trp Gly
                115                 120                 125

Gln Gly Thr Leu Val Thr Val Ser Ser Ala Ser Thr Lys Gly Pro Ser
                130                 135                 140

Val Phe Pro Leu Ala Pro Ser Ser Lys Ser Thr Ser Gly Gly Thr Ala
145                 150                 155                 160

Ala Leu Gly Cys Leu Val Lys Asp Tyr Phe Pro Glu Pro Val Thr Val
                165                 170                 175
```

```
Ser Trp Asn Ser Gly Ala Leu Thr Ser Gly Val His Thr Phe Pro Ala
            180                 185                 190

Val Leu Gln Ser Ser Gly Leu Tyr Ser Leu Ser Ser Val Val Thr Val
            195                 200                 205

Pro Ser Ser Ser Leu Gly Thr Gln Thr Tyr Ile Cys Asn Val Asn His
    210                 215                 220

Lys Pro Ser Asn Thr Lys Val Asp Lys Val Glu Pro Lys Ser Cys
225                 230                 235                 240

<210> SEQ ID NO 33
<211> LENGTH: 238
<212> TYPE: PRT
<213> ORGANISM: Artificial Sequence
<220> FEATURE:
<223> OTHER INFORMATION: Amino acid sequence of the light chain of
      humanized antibody VEGF-H988 Fab fragment containing signal
      peptide

<400> SEQUENCE: 33

Met Gly Trp Ser Cys Ile Ile Leu Phe Leu Val Ala Thr Ala Thr Gly
1               5                   10                  15

Val His Ser Glu Leu Gln Leu Thr Gln Ser Pro Ser Ser Leu Ser Ala
            20                  25                  30

Ser Val Gly Asp Arg Val Thr Ile Thr Cys Gln Ser Ser Lys Phe Leu
        35                  40                  45

Trp Gln Gly Arg Arg Leu Ala Trp Tyr Gln Gln Lys Pro Gly Lys Val
    50                  55                  60

Pro Lys Leu Leu Ile Tyr Gly Ala Ser Thr Leu Ala Ser Gly Val Pro
65                  70                  75                  80

Ser Arg Phe Lys Gly Ser Gly Ser Gly Thr Asp Phe Thr Leu Thr Ile
                85                  90                  95

Ser Ser Leu Gln Pro Glu Asp Val Ala Thr Tyr Tyr Cys Ala Gly Tyr
            100                 105                 110

Lys Ser Tyr Asp Gly Asp Val Val Gly Phe Gly Gly Thr Lys Val
        115                 120                 125

Glu Ile Lys Arg Thr Val Ala Ala Pro Ser Val Phe Ile Phe Pro Pro
    130                 135                 140

Ser Asp Glu Gln Leu Lys Ser Gly Thr Ala Ser Val Val Cys Leu Leu
145                 150                 155                 160

Asn Asn Phe Tyr Pro Arg Glu Ala Lys Val Gln Trp Lys Val Asp Asn
                165                 170                 175

Ala Leu Gln Ser Gly Asn Ser Gln Glu Ser Val Thr Glu Gln Asp Ser
            180                 185                 190

Lys Asp Ser Thr Tyr Ser Leu Ser Ser Thr Leu Thr Leu Ser Lys Ala
        195                 200                 205

Asp Tyr Glu Lys His Lys Val Tyr Ala Cys Glu Val Thr His Gln Gly
    210                 215                 220

Leu Ser Ser Pro Val Thr Lys Ser Phe Asn Arg Gly Glu Cys
225                 230                 235

<210> SEQ ID NO 34
<211> LENGTH: 19
<212> TYPE: PRT
<213> ORGANISM: Artificial Sequence
<220> FEATURE:
<223> OTHER INFORMATION: Amino acid sequence of heavy chain signal
      peptide
```

```
<400> SEQUENCE: 34

Met Gly Trp Ser Leu Ile Leu Leu Phe Leu Val Ala Val Ala Thr Arg
1               5                   10                  15

Val Leu Ser

<210> SEQ ID NO 35
<211> LENGTH: 19
<212> TYPE: PRT
<213> ORGANISM: Artificial Sequence
<220> FEATURE:
<223> OTHER INFORMATION: Amino acid sequence of light chain signal
      peptide

<400> SEQUENCE: 35

Met Gly Trp Ser Cys Ile Ile Leu Phe Leu Val Ala Thr Ala Thr Gly
1               5                   10                  15

Val His Ser

<210> SEQ ID NO 36
<211> LENGTH: 118
<212> TYPE: PRT
<213> ORGANISM: Artificial Sequence
<220> FEATURE:
<223> OTHER INFORMATION: Amino acid sequence of the heavy chain variable
      region of humanized antibody VEGF-H988 Fab fragment

<400> SEQUENCE: 36

Gln Ser Val Gln Glu Ser Gly Pro Gly Leu Val Lys Pro Ser Glu Thr
1               5                   10                  15

Leu Ser Leu Thr Cys Thr Val Ser Gly Ile Asp Leu Ser Ser Tyr Ala
            20                  25                  30

Ile Ser Trp Val Arg Gln Pro Pro Gly Lys Gly Leu Glu Tyr Ile Gly
        35                  40                  45

Tyr Ile Trp Asn Asp Leu Phe Thr Tyr Tyr Ala Ser Trp Ala Lys Gly
    50                  55                  60

Arg Val Thr Ile Ser Val Asp Thr Ser Lys Asn Gln Val Asp Leu Lys
65                  70                  75                  80

Leu Ser Ser Val Thr Ala Ala Asp Thr Ala Val Tyr Phe Cys Ala Arg
                85                  90                  95

Gly Thr Leu Gly Asp Tyr Gly Gly Met Asp Pro Trp Gly Gln Gly Thr
            100                 105                 110

Leu Val Thr Val Ser Ser
        115

<210> SEQ ID NO 37
<211> LENGTH: 112
<212> TYPE: PRT
<213> ORGANISM: Artificial Sequence
<220> FEATURE:
<223> OTHER INFORMATION: Amino acid sequence of the light chain variable
      region of humanized antibody VEGF-H988 Fab fragment

<400> SEQUENCE: 37

Glu Leu Gln Leu Thr Gln Ser Pro Ser Ser Leu Ser Ala Ser Val Gly
1               5                   10                  15

Asp Arg Val Thr Ile Thr Cys Gln Ser Ser Lys Phe Leu Trp Gln Gly
            20                  25                  30

Arg Arg Leu Ala Trp Tyr Gln Gln Lys Pro Gly Lys Val Pro Lys Leu
        35                  40                  45

Leu Ile Tyr Gly Ala Ser Thr Leu Ala Ser Gly Val Pro Ser Arg Phe
```

```
                  50                  55                  60
Lys Gly Ser Gly Ser Gly Thr Asp Phe Thr Leu Thr Ile Ser Ser Leu
 65                  70                  75                  80

Gln Pro Glu Asp Val Ala Thr Tyr Tyr Cys Ala Gly Tyr Lys Ser Tyr
                 85                  90                  95

Asp Gly Asp Val Val Gly Phe Gly Gly Gly Thr Lys Val Glu Ile Lys
                100                 105                 110
```

<210> SEQ ID NO 38
<211> LENGTH: 330
<212> TYPE: PRT
<213> ORGANISM: Artificial Sequence
<220> FEATURE:
<223> OTHER INFORMATION: Amino acid sequence of human IgG1 heavy chain
    constant region

<400> SEQUENCE: 38

```
Ala Ser Thr Lys Gly Pro Ser Val Phe Pro Leu Ala Pro Ser Ser Lys
 1               5                  10                  15

Ser Thr Ser Gly Gly Thr Ala Ala Leu Gly Cys Leu Val Lys Asp Tyr
                 20                  25                  30

Phe Pro Glu Pro Val Thr Val Ser Trp Asn Ser Gly Ala Leu Thr Ser
             35                  40                  45

Gly Val His Thr Phe Pro Ala Val Leu Gln Ser Ser Gly Leu Tyr Ser
         50                  55                  60

Leu Ser Ser Val Val Thr Val Pro Ser Ser Leu Gly Thr Gln Thr
 65                  70                  75                  80

Tyr Ile Cys Asn Val Asn His Lys Pro Ser Asn Thr Lys Val Asp Lys
                 85                  90                  95

Lys Val Glu Pro Lys Ser Cys Asp Lys Thr His Thr Cys Pro Pro Cys
                100                 105                 110

Pro Ala Pro Glu Leu Leu Gly Gly Pro Ser Val Phe Leu Phe Pro Pro
            115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
                180                 185                 190

His Gln Asp Trp Leu Asn Gly Lys Glu Tyr Lys Cys Lys Val Ser Asn
            195                 200                 205

Lys Ala Leu Pro Ala Pro Ile Glu Lys Thr Ile Ser Lys Ala Lys Gly
        210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300
```

```
Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 39
<211> LENGTH: 107
<212> TYPE: PRT
<213> ORGANISM: Artificial Sequence
<220> FEATURE:
<223> OTHER INFORMATION: Amino acid sequence of human kappa light chain
      constant region

<400> SEQUENCE: 39

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 40
<211> LENGTH: 103
<212> TYPE: PRT
<213> ORGANISM: Artificial Sequence
<220> FEATURE:
<223> OTHER INFORMATION: Amino acid sequence of human IgG1 heavy chain
      CH1 constant region

<400> SEQUENCE: 40

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys
            100

<210> SEQ ID NO 41
<211> LENGTH: 723
<212> TYPE: DNA
<213> ORGANISM: Artificial Sequence
<220> FEATURE:
<223> OTHER INFORMATION: Nucleotide sequence of humanized antibody
      VEGF-H988 Fab fragment heavy chain containing signal peptide
```

<400> SEQUENCE: 41

```
atgggctggt ccctgattct gctgttcctg gtggctgtgg ctaccagggt gctgagtcag    60
tctgtccagg agtctggacc tggactggtg aagccatctg agaccctgtc cctgacttgt   120
actgtgtctg gcattgacct gtcctcctat gccatctcct gggtgagaca acctcctggc   180
aagggattgg aatacattgg ctacatctgg aatgatctct caccactact atgcctcctgg   240
gctaagggca gggtgaccat ctctgtggac accagcaaga accaggtgga cctgaaactg   300
tcctctgtga cagcagcaga cacagcagtc tacttctgtg ccaggggcac cctgggagac   360
tacggcggga tggacccatg gggacagggc accctggtga cagtgtccag cgcaagcacc   420
aagggcccat cggtcttccc cctggcaccc tcctccaaga cacctctgg gggcacagcg   480
gccctgggct gcctggtcaa ggactacttc cccgaaccgg tgacggtgtc gtggaactca   540
ggcgccctga ccagcggcgt gcacaccttc ccggctgtcc tacagtcctc aggactctac   600
tccctcagca gcgtggtgac cgtgccctcc agcagcttgg gcacccagac ctacatctgc   660
aacgtgaatc acaagcccag caacaccaag gtggacaaga agttgagcc caaatcttgt   720
taa                                                                723
```

<210> SEQ ID NO 42
<211> LENGTH: 717
<212> TYPE: DNA
<213> ORGANISM: Artificial Sequence
<220> FEATURE:
<223> OTHER INFORMATION: Nucleotide sequence of humanized antibody
      VEGF-H988 Fab fragment light chain containing signal peptide

<400> SEQUENCE: 42

```
atgggctggt cctgtatcat cctgttcctg gtggctacag ccacaggagt gcatagtgaa    60
ctccaactta cccagagccc atcctccctg tctgcctctg tgggagacag ggtgaccatc   120
acttgtcagt ccagcaagtt cctctggcag ggcaggagac tggcttggta tcaacgaaag   180
cctggcaagg tgccaaaact gctgatttat ggagccagca ccctggcatc tggagtgcca   240
agcaggttca agggctctgg ctctggcaca gacttcaccc tgaccatctc ctccctccaa   300
cctgaggatg tggctaccta ctactgtgct ggctacaagt cctatgatgg agatgttgtg   360
ggctttggag gaggcaccaa ggtggagatt aagcgtacgg tggctgcacc atctgtcttc   420
atcttcccgc catctgatga gcagttgaaa tctggaactg cctctgttgt gtgcctgctg   480
aataacttct atcccagaga ggccaaagta cagtggaagg tggataacgc cctccaatcg   540
ggtaactccc aggagagtgt cacagagcag gacagcaagg acagcaccta cagcctcagc   600
agcaccctga cgctgagcaa agcagactac gagaaacaca agtctacgc ctgcgaagtc   660
acccatcagg gcctgagctc gcccgtcaca aagagcttca caggggaga gtgttaa     717
```

<210> SEQ ID NO 43
<211> LENGTH: 57
<212> TYPE: DNA
<213> ORGANISM: Artificial Sequence
<220> FEATURE:
<223> OTHER INFORMATION: Nucleotide sequence of heavy chain signal
      peptide

<400> SEQUENCE: 43

```
atgggctggt ccctgattct gctgttcctg gtggctgtgg ctaccagggt gctgagt     57
```

<210> SEQ ID NO 44
<211> LENGTH: 57

```
<212> TYPE: DNA
<213> ORGANISM: Artificial Sequence
<220> FEATURE:
<223> OTHER INFORMATION: Nucleotide sequence of light chain signal
      peptide

<400> SEQUENCE: 44
atgggctggt cctgtatcat cctgttcctg gtggctacag ccacaggagt gcatagt        57

<210> SEQ ID NO 45
<211> LENGTH: 354
<212> TYPE: DNA
<213> ORGANISM: Artificial Sequence
<220> FEATURE:
<223> OTHER INFORMATION: Nucleotide sequence of the heavy chain variable
      region of humanized antibody VEGF-H988 Fab fragment

<400> SEQUENCE: 45
cagtctgtcc aggagtctgg acctggactg gtgaagccat ctgagaccct gtccctgact      60
tgtactgtgt ctggcattga cctgtcctcc tatgccatct cctgggtgag acaacctcct    120
ggcaagggat tggaatacat tggctacatc tggaatgatc tcttcaccta ctatgcctcc    180
tgggctaagg gcagggtgac catctctgtg gacaccagca agaaccaggt ggacctgaaa    240
ctgtcctctg tgacagcagc agacacagca gtctacttct gtgccagggg caccctggga    300
gactacggcg ggatggaccc atggggacag ggcaccctgg tgacagtgtc cagc           354

<210> SEQ ID NO 46
<211> LENGTH: 336
<212> TYPE: DNA
<213> ORGANISM: Artificial Sequence
<220> FEATURE:
<223> OTHER INFORMATION: Nucleotide sequence of the light chain variable
      region of humanized antibody VEGF-H988 Fab fragment

<400> SEQUENCE: 46
gaactccaac ttacccagag cccatcctcc ctgtctgcct ctgtgggaga cagggtgacc      60
atcacttgtc agtccagcaa gttcctctgg cagggcagga gactggcttg gtatcaacag    120
aagcctggca aggtgccaaa actgctgatt tatggagcca gcaccctggc atctggagtg    180
ccaagcaggt tcaagggctc tggctctggc acagacttca ccctgaccat ctcctccctc    240
caacctgagg atgtggctac ctactactgt gctggctaca gtcctatga tggagatgtt     300 gtgggctttg gaggaggcac caaggtggag attaag                              336

<210> SEQ ID NO 47
<211> LENGTH: 993
<212> TYPE: DNA
<213> ORGANISM: Artificial Sequence
<220> FEATURE:
<223> OTHER INFORMATION: Nucleotide sequence of human IgG1 heavy chain
      constant region

<400> SEQUENCE: 47
gcaagcacca agggcccatc ggtcttcccc ctggcaccct cctccaagag cacctctggg      60
ggcacagcgg ccctgggctg cctggtcaag gactacttcc ccgaaccggt gacggtgtcg    120
tggaactcag gcgccctgac cagcggcgtg cacaccttcc cggctgtcct acagtcctca    180
ggactctact ccctcagcag cgtggtgacc gtgccctcca gcagcttggg cacccagacc    240
tacatctgca acgtgaatca caagcccagc aacaccaagg tggacaagaa agttgagccc    300
aaatcttgtg acaaaactca cacatgccca ccgtgcccag cacctgaact cctgggggga    360
```

```
ccgtcagtct tcctcttccc cccaaaaccc aaggacaccc tcatgatctc ccggacccct      420
gaggtcacgt gcgtggtggt ggacgtgagc cacgaagacc ccgaggtcaa gttcaactgg      480
tacgtggacg gcgtggaggt gcataatgcc aagacaaagc cgcgggagga gcagtacaac      540
agcacgtacc gtgtggtcag cgtcctcacc gtcctgcacc aggactggct gaatggcaag      600
gagtacaagt gcaaggtctc caacaaagcc ctcccagccc catcgagaaa accatctcc      660 aaagccaaag gcagcccg agaaccacag gtgtacaccc tgcccccatc ccgggatgag      720
ctgaccaaga accaggtcag cctgacctgc ctggtcaaag gcttctatcc cagcgacatc      780
gccgtggagt gggagagcaa tgggcagccg gagaacaact acaagaccac gcctcccgtg      840
ctggactccg acggctcctt cttcctctac agcaagctca ccgtggacaa gagcaggtgg      900
cagcagggga acgtcttctc atgctccgtg atgcatgagg ctctgcacaa ccactacacg      960
cagaagagcc tctccctgtc tccgggtaaa taa                                    993
```

<210> SEQ ID NO 48
<211> LENGTH: 324
<212> TYPE: DNA
<213> ORGANISM: Artificial Sequence
<220> FEATURE:
<223> OTHER INFORMATION: Nucleotide sequence of human kappa light chain
      constant region

<400> SEQUENCE: 48

```
cgtacggtgg ctgcaccatc tgtcttcatc ttcccgccat ctgatgagca gttgaaatct       60
ggaactgcct ctgttgtgtg cctgctgaat aacttctatc ccagagaggc caaagtacag      120
tggaaggtgg ataacgccct ccaatcgggt aactcccagg agagtgtcac agagcaggac      180
agcaaggaca gcacctacag cctcagcagc accctgacgc tgagcaaagc agactacgag      240
aaacacaaag tctacgcctg cgaagtcacc catcagggcc tgagctcgcc cgtcacaaag      300
agcttcaaca ggggagagtg ttaa                                              324
```

<210> SEQ ID NO 49
<211> LENGTH: 312
<212> TYPE: DNA
<213> ORGANISM: Artificial Sequence
<220> FEATURE:
<223> OTHER INFORMATION: Nucleotide sequence of human IgG1 heavy chain
      CH1 constant region

<400> SEQUENCE: 49

```
gcaagcacca agggcccatc ggtcttcccc ctggcaccct cctccaagag cacctctggg       60
ggcacagcgg ccctgggctg cctggtcaag gactacttcc ccgaaccggt gacggtgtcg      120
tggaactcag gcgccctgac cagcggcgtg cacaccttcc cggctgtcct acagtcctca      180
ggactctact ccctcagcag cgtggtgacc gtgccctcca gcagcttggg cacccagacc      240
tacatctgca acgtgaatca caagcccagc aacaccaagg tggacaagaa agttgagccc      300
aaatcttgtt aa                                                           312
```

<210> SEQ ID NO 50
<211> LENGTH: 246
<212> TYPE: PRT
<213> ORGANISM: Artificial Sequence
<220> FEATURE:
<223> OTHER INFORMATION: Amino acid sequence of the rabbit antibody scFv
      used in the construction of antibody VEGF165-R988

<400> SEQUENCE: 50

```
Glu Leu Asp Leu Thr Gln Thr Pro Ser Pro Val Ser Ala Ala Val Gly
1               5                   10                  15

Gly Thr Val Thr Ile Asn Cys Gln Ser Ser Gln Thr Ile Tyr Ala Asn
            20                  25                  30

Arg Arg Leu Ala Trp Tyr Gln Gln Lys Pro Gly Gln Pro Pro Lys Leu
        35                  40                  45

Leu Ile Tyr Gly Ala Ser Thr Leu Ala Ser Gly Val Pro Ser Arg Phe
    50                  55                  60

Lys Gly Ser Gly Ser Gly Thr Gln Phe Thr Leu Thr Ile Ser Gly Val
65                  70                  75                  80

Gln Cys Asp Asp Ala Ala Thr Tyr Tyr Cys Ala Gly Tyr Lys Ser Tyr
                85                  90                  95

Asp Gly Asp Asp Val Gly Phe Gly Gly Gly Thr Glu Val Val Val Lys
            100                 105                 110

Ser Ser Gly Gly Gly Gly Ser Gly Gly Gly Gly Gly Ser Ser Arg
            115                 120                 125

Ser Ser Gln Ser Val Glu Glu Ser Gly Gly Arg Leu Val Thr Pro Gly
            130                 135                 140

Thr Pro Leu Thr Leu Thr Cys Thr Val Ser Gly Ile Asp Leu Ser Ser
145                 150                 155                 160

Tyr Ala Ile Ser Trp Val Arg Gln Ala Pro Gly Lys Gly Leu Glu Tyr
                165                 170                 175

Ile Gly Tyr Ile Trp Asn Ala Gly Asn Thr Tyr Tyr Ala Ser Trp Ala
            180                 185                 190

Lys Gly Arg Phe Thr Ile Ser Lys Thr Ser Thr Thr Val Asp Leu Lys
        195                 200                 205

Ile Thr Ser Pro Thr Thr Glu Asp Thr Ala Thr Tyr Phe Cys Ala Arg
    210                 215                 220

Gly Thr Leu Gly Asp Tyr Asn Gly Met Asp Pro Trp Gly Pro Gly Thr
225                 230                 235                 240

Leu Val Thr Val Ser Ser
                245

<210> SEQ ID NO 51
<211> LENGTH: 18
<212> TYPE: PRT
<213> ORGANISM: Artificial Sequence
<220> FEATURE:
<223> OTHER INFORMATION: Amino acid sequence of the linker used in the
      construction of the phage antibody library for the linkage of
      rabbit antibody scFv

<400> SEQUENCE: 51

Ser Ser Gly Gly Gly Gly Ser Gly Gly Gly Gly Gly Ser Ser Arg
1               5                   10                  15

Ser Ser

<210> SEQ ID NO 52
<211> LENGTH: 1377
<212> TYPE: DNA
<213> ORGANISM: Artificial Sequence
<220> FEATURE:
<223> OTHER INFORMATION: Nucleotide sequence of the rabbit antibody
      VEGF165-R988 heavy chain containing signal peptide

<400> SEQUENCE: 52
atgggctggt ccctgattct gctgttcctg gtggctgtgg ctaccagggt gctgagtcag      60
tcggtggagg agtccggggg tcgcctggta acgcctggga caccccctgac actcacctgc    120
```

```
acagtctctg gaatcgacct cagtagctat gcaataagct gggtccgcca ggctccaggg      180
aaggggctgg aatacatcgg atacatttgg aatgctggta acacctacta cgcgagctgg      240
gcaaaaggcc gattcaccat ctccaaaacc tcgaccacgg tggatctgaa aatcaccagt      300
ccgacaaccg aggacacggc cacctatttc tgtgccagag aacattaggg ggactacaat      360
ggcatggacc cctggggccc agggaccctc gtcaccgtct cttcaggtca acctaaggct      420
ccgtcagtct tcccactggc ccctgctgc ggggacacac ccagtccac ggtgaccctg        480 ggctgcctgg tcaaaggcta cctcccggag ccagtgaccg tgacctggaa ctcgggcacc      540
ctcaccaatg gggtacgcac cttcccgtcc gtccggcagt cctcaggcct ctactcgctg      600
agcagcgtgg tgagcgtgac ctcaagcagc agcccgtca cctgcaacgt ggcccaccca      660
gccaccaaca ccaaagtgga caagaccgtt gcgccctcga catgcagcaa gcccacgtgc      720
ccaccccctg aactcctggg gggaccgtct gtcttcatct tccccccaaa acccaaggac      780
accctcatga tctcacgcac ccccgaggtc acatgcgtgg tggtggacgt gagccaggat      840
gaccccgagg tgcagttcac atggtacata aacaacgagc aggtgcgcac cgcccggccg      900
ccgctacggg agcagcagtt caacagcacg atccgcgtgg tcagcaccct ccccatcgcg      960
caccaggact ggctgagggg caaggagttc aagtgcaaag tccacaacaa ggcactcccg     1020
gcccccatcg agaaaaccat ctccaaagcc agagggcagc ccctggagcc gaaggtctac     1080
accatgggcc ctccccggga ggagctgagc agcaggtcgg tcagcctgac ctgcatgatc     1140
aacggcttct acccttccga catctcggtg gagtgggaga gaacgggaa ggcagaggac      1200 aactacaaga ccacgccggc cgtgctggac agcgacggct cctacttcct ctacagcaag     1260
ctctcagtgc ccacgagtga gtggcagcgg ggcgacgtct tcacctgctc cgtgatgcac     1320
gaggccttgc acaaccacta cacgcagaag tccatctccc gctctccggg taaatga       1377
```

<210> SEQ ID NO 53
<211> LENGTH: 708
<212> TYPE: DNA
<213> ORGANISM: Artificial Sequence
<220> FEATURE:
<223> OTHER INFORMATION: Nucleotide sequence of the rabbit antibody
      VEGF165-R988 light chain containing signal peptide

<400> SEQUENCE: 53

```
atgggctggt cctgtatcat cctgttcctg gtggctacag ccacaggagt gcatagtgag       60
ctcgatctga cccagactcc atccccgtg tctgcggctg ttggaggcac agtcaccatc       120
aattgccagt ccagtcagac tatttatgct aacaggcgct tagcctggta tcaacagaaa      180
ccagggcagc ctcccaagct cctgatctat ggtgcatcca ctctggcatc tggggtccca      240
tcgcggttca aaggcagtgg atctgggaca cagttcactc tcaccatcag cggcgtgcag      300
tgtgacgatg ctgccactta ctactgtgca ggctatataaa gttatgatgg tgatgatgtt    360
ggtttcggcg gagggaccga ggtggtcgtc aaagggggatc cagttgcacc tactgtcctc    420
atcttcccac cagctgctga tcaggtggca actggaacag tcaccatcgt gtgtgtggcg     480
aataaatact ttcccgatgt caccgtcacc tgggaggtgg atggcaccac ccaaacaact     540
ggcatcgaga acagtaaaac accgcagaat tctgcagatt gtacctacaa cctcagcagc    600
actctgacac tgaccagcac acagtacaac agccacaaag agtacacctg caaggtgacc    660
cagggcacga cctcagtcgt ccagagcttc aatagggggtg actgttaa                 708
```

```
<210> SEQ ID NO 54
<211> LENGTH: 458
<212> TYPE: PRT
<213> ORGANISM: Artificial Sequence
<220> FEATURE:
<223> OTHER INFORMATION: Amino acid sequence of the rabbit antibody
      VEGF165-R988 heavy chain containing signal peptide

<400> SEQUENCE: 54
```

| | | | | | | | | | | | | | | |
|---|---|---|---|---|---|---|---|---|---|---|---|---|---|---|
| Met | Gly | Trp | Ser | Leu | Ile | Leu | Leu | Phe | Leu | Val | Ala | Val | Ala | Thr | Arg |
| 1 | | | | 5 | | | | | 10 | | | | | 15 | |

Val Leu Ser Gln Ser Val Glu Glu Ser Gly Gly Arg Leu Val Thr Pro
          20                  25                  30

Gly Thr Pro Leu Thr Leu Thr Cys Thr Val Ser Gly Ile Asp Leu Ser
              35                  40                  45

Ser Tyr Ala Ile Ser Trp Val Arg Gln Ala Pro Gly Lys Gly Leu Glu
 50                  55                  60

Tyr Ile Gly Tyr Ile Trp Asn Ala Gly Asn Thr Tyr Tyr Ala Ser Trp
 65                  70                  75                  80

Ala Lys Gly Arg Phe Thr Ile Ser Lys Thr Ser Thr Val Asp Leu
                  85                  90                  95

Lys Ile Thr Ser Pro Thr Thr Glu Asp Thr Ala Thr Tyr Phe Cys Ala
                     100                 105                 110

Arg Gly Thr Leu Gly Asp Tyr Asn Gly Met Asp Pro Trp Gly Pro Gly
             115                 120                 125

Thr Leu Val Thr Val Ser Ser Gly Gln Pro Lys Ala Pro Ser Val Phe
 130                 135                 140

Pro Leu Ala Pro Cys Cys Gly Asp Thr Pro Ser Ser Thr Val Thr Leu
145                 150                 155                 160

Gly Cys Leu Val Lys Gly Tyr Leu Pro Glu Pro Val Thr Val Thr Trp
                 165                 170                 175

Asn Ser Gly Thr Leu Thr Asn Gly Val Arg Thr Phe Pro Ser Val Arg
             180                 185                 190

Gln Ser Ser Gly Leu Tyr Ser Leu Ser Ser Val Val Ser Val Thr Ser
         195                 200                 205

Ser Ser Gln Pro Val Thr Cys Asn Val Ala His Pro Ala Thr Asn Thr
210                 215                 220

Lys Val Asp Lys Thr Val Ala Pro Ser Thr Cys Ser Lys Pro Thr Cys
225                 230                 235                 240

Pro Pro Pro Glu Leu Leu Gly Gly Pro Ser Val Phe Ile Phe Pro Pro
                 245                 250                 255

Lys Pro Lys Asp Thr Leu Met Ile Ser Arg Thr Pro Glu Val Thr Cys
             260                 265                 270

Val Val Val Asp Val Ser Gln Asp Asp Pro Glu Val Gln Phe Thr Trp
         275                 280                 285

Tyr Ile Asn Asn Glu Gln Val Arg Thr Ala Arg Pro Pro Leu Arg Glu
290                 295                 300

Gln Gln Phe Asn Ser Thr Ile Arg Val Val Ser Thr Leu Pro Ile Ala
305                 310                 315                 320

His Gln Asp Trp Leu Arg Gly Lys Glu Phe Lys Cys Lys Val His Asn
                 325                 330                 335

Lys Ala Leu Pro Ala Pro Ile Glu Lys Thr Ile Ser Lys Ala Arg Gly
             340                 345                 350

Gln Pro Leu Glu Pro Lys Val Tyr Thr Met Gly Pro Pro Arg Glu Glu
         355                 360                 365

Leu Ser Ser Arg Ser Val Ser Leu Thr Cys Met Ile Asn Gly Phe Tyr
370                 375                 380

Pro Ser Asp Ile Ser Val Glu Trp Glu Lys Asn Gly Lys Ala Glu Asp
385                 390                 395                 400

Asn Tyr Lys Thr Thr Pro Ala Val Leu Asp Ser Asp Gly Ser Tyr Phe
                405                 410                 415

Leu Tyr Ser Lys Leu Ser Val Pro Thr Ser Glu Trp Gln Arg Gly Asp
                420                 425                 430

Val Phe Thr Cys Ser Val Met His Glu Ala Leu His Asn His Tyr Thr
                435                 440                 445

Gln Lys Ser Ile Ser Arg Ser Pro Gly Lys
450                 455

<210> SEQ ID NO 55
<211> LENGTH: 235
<212> TYPE: PRT
<213> ORGANISM: Artificial Sequence
<220> FEATURE:
<223> OTHER INFORMATION: Amino acid sequence of the rabbit antibody
      VEGF165-R988 light chain containing signal peptide

<400> SEQUENCE: 55

Met Gly Trp Ser Cys Ile Ile Leu Phe Leu Val Ala Thr Ala Thr Gly
1               5                   10                  15

Val His Ser Glu Leu Asp Leu Thr Gln Thr Pro Ser Pro Val Ser Ala
                20                  25                  30

Ala Val Gly Gly Thr Val Thr Ile Asn Cys Gln Ser Ser Gln Thr Ile
                35                  40                  45

Tyr Ala Asn Arg Arg Leu Ala Trp Tyr Gln Gln Lys Pro Gly Gln Pro
50                  55                  60

Pro Lys Leu Leu Ile Tyr Gly Ala Ser Thr Leu Ala Ser Gly Val Pro
65                  70                  75                  80

Ser Arg Phe Lys Gly Ser Gly Ser Gly Thr Gln Phe Thr Leu Thr Ile
                85                  90                  95

Ser Gly Val Gln Cys Asp Asp Ala Ala Thr Tyr Tyr Cys Ala Gly Tyr
                100                 105                 110

Lys Ser Tyr Asp Gly Asp Val Gly Phe Gly Gly Gly Thr Glu Val
                115                 120                 125

Val Val Lys Gly Asp Pro Val Ala Pro Thr Val Leu Ile Phe Pro Pro
            130                 135                 140

Ala Ala Asp Gln Val Ala Thr Gly Thr Val Thr Ile Val Cys Val Ala
145                 150                 155                 160

Asn Lys Tyr Phe Pro Asp Val Thr Val Thr Trp Glu Val Asp Gly Thr
                165                 170                 175

Thr Gln Thr Thr Gly Ile Glu Asn Ser Lys Thr Pro Gln Asn Ser Ala
                180                 185                 190

Asp Cys Thr Tyr Asn Leu Ser Ser Thr Leu Thr Leu Thr Ser Thr Gln
                195                 200                 205

Tyr Asn Ser His Lys Glu Tyr Thr Cys Lys Val Thr Gln Gly Thr Thr
                210                 215                 220

Ser Val Val Gln Ser Phe Asn Arg Gly Asp Cys
225                 230                 235

<210> SEQ ID NO 56
<211> LENGTH: 33
<212> TYPE: DNA
<213> ORGANISM: Artificial Sequence

```
<220> FEATURE:
<223> OTHER INFORMATION: primer

<400> SEQUENCE: 56
accagggtgc tgagtcagtc ggtggaggag tcc                             33

<210> SEQ ID NO 57
<211> LENGTH: 24
<212> TYPE: DNA
<213> ORGANISM: Artificial Sequence
<220> FEATURE:
<223> OTHER INFORMATION: primer

<400> SEQUENCE: 57
tgtgaccagg gtacctgggc ccca                                      24

<210> SEQ ID NO 58
<211> LENGTH: 35
<212> TYPE: DNA
<213> ORGANISM: Artificial Sequence
<220> FEATURE:
<223> OTHER INFORMATION: primer

<400> SEQUENCE: 58
acaggagtgc atagtgagct cgatctgacc cagac                          35

<210> SEQ ID NO 59
<211> LENGTH: 35
<212> TYPE: DNA
<213> ORGANISM: Artificial Sequence
<220> FEATURE:
<223> OTHER INFORMATION: primer

<400> SEQUENCE: 59
ggtgcaactg gatcccettt gacgaccacc tcggt                          35

<210> SEQ ID NO 60
<211> LENGTH: 50
<212> TYPE: DNA
<213> ORGANISM: Artificial Sequence
<220> FEATURE:
<223> OTHER INFORMATION: primer

<400> SEQUENCE: 60
ccacaggagt gcatagtgaa ctccaactta cccagagccc atcctccctg          50

<210> SEQ ID NO 61
<211> LENGTH: 33
<212> TYPE: DNA
<213> ORGANISM: Artificial Sequence
<220> FEATURE:
<223> OTHER INFORMATION: primer

<400> SEQUENCE: 61
cctgtctccc acagaggcag acagggagga tgg                            33

<210> SEQ ID NO 62
<211> LENGTH: 33
<212> TYPE: DNA
<213> ORGANISM: Artificial Sequence
<220> FEATURE:
<223> OTHER INFORMATION: primer

<400> SEQUENCE: 62
tctgtgggag acagggtgac catcacttgt cag                            33
```

```
<210> SEQ ID NO 63
<211> LENGTH: 33
<212> TYPE: DNA
<213> ORGANISM: Artificial Sequence
<220> FEATURE:
<223> OTHER INFORMATION: primer

<400> SEQUENCE: 63
ggcatagatg gtctggctgg actgacaagt gat                                33

<210> SEQ ID NO 64
<211> LENGTH: 28
<212> TYPE: DNA
<213> ORGANISM: Artificial Sequence
<220> FEATURE:
<223> OTHER INFORMATION: primer

<400> SEQUENCE: 64
cagaccatct atgccaacag gagactgg                                      28

<210> SEQ ID NO 65
<211> LENGTH: 28
<212> TYPE: DNA
<213> ORGANISM: Artificial Sequence
<220> FEATURE:
<223> OTHER INFORMATION: primer

<400> SEQUENCE: 65
ttctgttgat accaagccag tctcctgt                                      28

<210> SEQ ID NO 66
<211> LENGTH: 28
<212> TYPE: DNA
<213> ORGANISM: Artificial Sequence
<220> FEATURE:
<223> OTHER INFORMATION: primer

<400> SEQUENCE: 66
ttggtatcaa cagaagcctg gcaaggtg                                      28

<210> SEQ ID NO 67
<211> LENGTH: 28
<212> TYPE: DNA
<213> ORGANISM: Artificial Sequence
<220> FEATURE:
<223> OTHER INFORMATION: primer

<400> SEQUENCE: 67
aaatcagcag ttttggcacc ttgccagg                                      28

<210> SEQ ID NO 68
<211> LENGTH: 28
<212> TYPE: DNA
<213> ORGANISM: Artificial Sequence
<220> FEATURE:
<223> OTHER INFORMATION: primer

<400> SEQUENCE: 68
caaaactgct gatttatgga gccagcac                                      28

<210> SEQ ID NO 69
<211> LENGTH: 28
<212> TYPE: DNA
<213> ORGANISM: Artificial Sequence
<220> FEATURE:
<223> OTHER INFORMATION: primer
```

-continued

<400> SEQUENCE: 69
cactccagat gccagggtgc tggctcca                                    28

<210> SEQ ID NO 70
<211> LENGTH: 33
<212> TYPE: DNA
<213> ORGANISM: Artificial Sequence
<220> FEATURE:
<223> OTHER INFORMATION: primer

<400> SEQUENCE: 70
ctggcatctg gagtgccaag caggttcaag ggc                              33

<210> SEQ ID NO 71
<211> LENGTH: 33
<212> TYPE: DNA
<213> ORGANISM: Artificial Sequence
<220> FEATURE:
<223> OTHER INFORMATION: primer

<400> SEQUENCE: 71
gaagtctgtg ccagagccag agcccttgaa cct                              33

<210> SEQ ID NO 72
<211> LENGTH: 33
<212> TYPE: DNA
<213> ORGANISM: Artificial Sequence
<220> FEATURE:
<223> OTHER INFORMATION: primer

<400> SEQUENCE: 72
tctggcacag acttcaccct gaccatctcc tcc                              33

<210> SEQ ID NO 73
<211> LENGTH: 33
<212> TYPE: DNA
<213> ORGANISM: Artificial Sequence
<220> FEATURE:
<223> OTHER INFORMATION: primer

<400> SEQUENCE: 73
agccacatcc tcaggttgga gggaggagat ggt                              33

<210> SEQ ID NO 74
<211> LENGTH: 33
<212> TYPE: DNA
<213> ORGANISM: Artificial Sequence
<220> FEATURE:
<223> OTHER INFORMATION: primer

<400> SEQUENCE: 74
cctgaggatg tggctaccta ctactgtgct ggc                              33

<210> SEQ ID NO 75
<211> LENGTH: 33
<212> TYPE: DNA
<213> ORGANISM: Artificial Sequence
<220> FEATURE:
<223> OTHER INFORMATION: primer

<400> SEQUENCE: 75
atctccatca taggacttgt agccagcaca gta                              33

<210> SEQ ID NO 76

```
<211> LENGTH: 33
<212> TYPE: DNA
<213> ORGANISM: Artificial Sequence
<220> FEATURE:
<223> OTHER INFORMATION: primer

<400> SEQUENCE: 76
tcctatgatg gagatgatgt gggctttgga gga                           33

<210> SEQ ID NO 77
<211> LENGTH: 50
<212> TYPE: DNA
<213> ORGANISM: Artificial Sequence
<220> FEATURE:
<223> OTHER INFORMATION: primer

<400> SEQUENCE: 77
ggtgcagcca ccgtacgctt aatctccacc ttggtgcctc ctccaaagcc         50

<210> SEQ ID NO 78
<211> LENGTH: 51
<212> TYPE: DNA
<213> ORGANISM: Artificial Sequence
<220> FEATURE:
<223> OTHER INFORMATION: primer

<400> SEQUENCE: 78
gctaccaggg tgctgagtca gtctgtccag gagtctggac ctggactggt g       51

<210> SEQ ID NO 79
<211> LENGTH: 33
<212> TYPE: DNA
<213> ORGANISM: Artificial Sequence
<220> FEATURE:
<223> OTHER INFORMATION: primer

<400> SEQUENCE: 79
ggacagggtc tcagatggct tcaccagtcc agg                           33

<210> SEQ ID NO 80
<211> LENGTH: 33
<212> TYPE: DNA
<213> ORGANISM: Artificial Sequence
<220> FEATURE:
<223> OTHER INFORMATION: primer

<400> SEQUENCE: 80
tctgagaccc tgtccctgac ttgtactgtg tct                           33

<210> SEQ ID NO 81
<211> LENGTH: 33
<212> TYPE: DNA
<213> ORGANISM: Artificial Sequence
<220> FEATURE:
<223> OTHER INFORMATION: primer

<400> SEQUENCE: 81
ataggaggac aggtcaatgc cagacacagt aca                           33

<210> SEQ ID NO 82
<211> LENGTH: 31
<212> TYPE: DNA
<213> ORGANISM: Artificial Sequence
<220> FEATURE:
<223> OTHER INFORMATION: primer

<400> SEQUENCE: 82
```

-continued gacctgtcct cctatgccat ctcctgggtg a        31

<210> SEQ ID NO 83
<211> LENGTH: 31
<212> TYPE: DNA
<213> ORGANISM: Artificial Sequence
<220> FEATURE:
<223> OTHER INFORMATION: primer

<400> SEQUENCE: 83
cccttgccag gaggttgtct cacccaggag a        31

<210> SEQ ID NO 84
<211> LENGTH: 31
<212> TYPE: DNA
<213> ORGANISM: Artificial Sequence
<220> FEATURE:
<223> OTHER INFORMATION: primer

<400> SEQUENCE: 84
acctcctggc aagggattgg aatacattgg c        31

<210> SEQ ID NO 85
<211> LENGTH: 31
<212> TYPE: DNA
<213> ORGANISM: Artificial Sequence
<220> FEATURE:
<223> OTHER INFORMATION: primer

<400> SEQUENCE: 85
tgccagcatt ccagatgtag ccaatgtatt c        31

<210> SEQ ID NO 86
<211> LENGTH: 31
<212> TYPE: DNA
<213> ORGANISM: Artificial Sequence
<220> FEATURE:
<223> OTHER INFORMATION: primer

<400> SEQUENCE: 86
tctggaatgc tggcaacacc tactatgcct c        31

<210> SEQ ID NO 87
<211> LENGTH: 31
<212> TYPE: DNA
<213> ORGANISM: Artificial Sequence
<220> FEATURE:
<223> OTHER INFORMATION: primer

<400> SEQUENCE: 87
caccctgccc ttagcccagg aggcatagta g        31

<210> SEQ ID NO 88
<211> LENGTH: 33
<212> TYPE: DNA
<213> ORGANISM: Artificial Sequence
<220> FEATURE:
<223> OTHER INFORMATION: primer

<400> SEQUENCE: 88
gctaagggca gggtgaccat ctctgtggac acc        33

<210> SEQ ID NO 89
<211> LENGTH: 33
<212> TYPE: DNA

```
<213> ORGANISM: Artificial Sequence
<220> FEATURE:
<223> OTHER INFORMATION: primer

<400> SEQUENCE: 89
caggtccacc tggttcttgc tggtgtccac aga                                    33

<210> SEQ ID NO 90
<211> LENGTH: 33
<212> TYPE: DNA
<213> ORGANISM: Artificial Sequence
<220> FEATURE:
<223> OTHER INFORMATION: primer

<400> SEQUENCE: 90
aaccaggtgg acctgaaact gtcctctgtg aca                                    33

<210> SEQ ID NO 91
<211> LENGTH: 33
<212> TYPE: DNA
<213> ORGANISM: Artificial Sequence
<220> FEATURE:
<223> OTHER INFORMATION: primer

<400> SEQUENCE: 91
gtagactgct gtgtctgctg ctgtcacaga gga                                    33

<210> SEQ ID NO 92
<211> LENGTH: 33
<212> TYPE: DNA
<213> ORGANISM: Artificial Sequence
<220> FEATURE:
<223> OTHER INFORMATION: primer

<400> SEQUENCE: 92
gacacagcag tctacttctg tgccaggggc acc                                    33

<210> SEQ ID NO 93
<211> LENGTH: 33
<212> TYPE: DNA
<213> ORGANISM: Artificial Sequence
<220> FEATURE:
<223> OTHER INFORMATION: primer

<400> SEQUENCE: 93
catcccattg tagtctccca gggtgcccct ggc                                    33

<210> SEQ ID NO 94
<211> LENGTH: 33
<212> TYPE: DNA
<213> ORGANISM: Artificial Sequence
<220> FEATURE:
<223> OTHER INFORMATION: primer

<400> SEQUENCE: 94
gactacaatg ggatggaccc atggggacct ggc                                    33

<210> SEQ ID NO 95
<211> LENGTH: 50
<212> TYPE: DNA
<213> ORGANISM: Artificial Sequence
```

```
<220> FEATURE:
<223> OTHER INFORMATION: primer

<400> SEQUENCE: 95
gggcccttgg tgctagcgct ggacactgtc accagggtgc caggtcccca            50
```

What is claimed is:

1. An isolated anti-VEGF antibody Fab fragment, comprising:
   (a) a heavy chain variable region comprising:
      (i) a heavy chain CDR1 region having the amino acid sequence as set forth in SEQ ID NO: 27;
      (ii) a heavy chain CDR2 region having the amino acid sequence as set forth in SEQ ID NO: 28; and
      (iii) a heavy chain CDR3 region having the amino acid sequence as set forth in SEQ ID NO: 29; and
   (b) a light chain variable region comprising:
      (i) a light chain CDR1 region having the amino acid sequence as set forth in SEQ ID NO: 24;
      (ii) a light chain CDR2 region having the amino acid sequence as set forth in SEQ ID NO: 25; and
      (iii) a light chain CDR3 region having the amino acid sequence as set forth in SEQ ID NO: 26.

2. The anti-VEGF antibody Fab fragment according to claim 1, comprising:
   a heavy chain variable region having the amino acid sequence as set forth in SEQ ID NO: 36, or an amino acid sequence having at least 90%, at least 92%, at least 95%, at least 98%, or at least 99% sequence identity to SEQ ID NO: 36; and
   a light chain variable region having the amino acid sequence as set forth in SEQ ID NO: 37, or an amino acid sequence having at least 90%, at least 92%, at least 95%, at least 98%, or at least 99% sequence identity to SEQ ID NO: 37.

3. The anti-VEGF antibody Fab fragment according to claim 1, which is a Fab fragment, further comprising:
   a heavy chain constant region CH1 that is a IgG1 heavy chain constant region comprising one of:
      the amino acid sequence as set forth in SEQ ID NO: 40, and
      an amino acid sequence having at least 90%, at least 92%, at least 95%, at least 98%, or at least 99% sequence identity to SEQ ID NO: 40; and
   a light chain constant region having one of:
      the amino acid sequence as set forth in SEQ ID NO: 39, and
      an amino acid sequence having at least 90%, at least 92%, at least 95%, at least 98%, or at least 99% sequence identity to SEQ ID NO: 39,
   wherein the heavy chain constant region is attached to the heavy chain variable region and the light chain constant region is attached to the light chain variable region.

4. The anti-VEGF antibody Fab fragment according to claim 1, further comprising:
   a heavy chain signal peptide that is one of:
      the amino acid sequence as set forth in SEQ ID NO: 34, and
      an amino acid sequence having at least 90%, at least 92%, at least 95%, at least 98%, or at least 99% sequence identity to SEQ ID NO: 34; and
   a light chain signal peptide that is one of:
      the amino acid sequence as set forth in SEQ ID NO: 35, and
      an amino acid sequence having at least 90%, at least 92%, at least 95%, at least 98%, or at least 99% sequence identity to SEQ ID NO: 35.

5. The anti-VEGF antibody Fab fragment according to claim 1, wherein the anti-VEGF antibody Fab fragment is monoclonal.

* * * * *